US008847939B2

(12) United States Patent
Kishi

(10) Patent No.: US 8,847,939 B2
(45) Date of Patent: Sep. 30, 2014

(54) METHOD OF DRIVING AND A DRIVER FOR A DISPLAY DEVICE INCLUDING AN ELECTRIC CURRENT DRIVING ELEMENT

(75) Inventor: Noritaka Kishi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 607 days.

(21) Appl. No.: 12/312,538

(22) PCT Filed: Oct. 1, 2007

(86) PCT No.: PCT/JP2007/069184
§ 371 (c)(1), (2), (4) Date: May 15, 2009

(87) PCT Pub. No.: WO2008/108024
PCT Pub. Date: Sep. 12, 2008

(65) Prior Publication Data

US 2010/0045646 A1 Feb. 25, 2010

(30) Foreign Application Priority Data

Mar. 8, 2007 (JP) .................................. 2007-58021

(51) Int. Cl.
*G06F 3/038* (2013.01)
*G09G 5/00* (2006.01)
*G09G 3/32* (2006.01)

(52) U.S. Cl.
CPC ...... *G09G 3/3291* (2013.01); *G09G 2320/0233* (2013.01); *G09G 2300/0852* (2013.01); *G09G 2320/0295* (2013.01); *G09G 3/3233* (2013.01); *G09G 2300/0819* (2013.01)
USPC .......................................................... 345/211

(58) Field of Classification Search
USPC .......................................................... 345/211
See application file for complete search history.

(56) References Cited

U.S. PATENT DOCUMENTS 6,229,506 B1 5/2001 Dawson et al.
2004/0070557 A1* 4/2004 Asano et al. .................... 345/76

(Continued)

FOREIGN PATENT DOCUMENTS

JP 2002-278513 9/2002
JP 2002278513 A * 9/2002

(Continued)

OTHER PUBLICATIONS

Nathan, Arokia, et al. "Invited Paper: a-Si for AMOLED—Meeting the Performance and Cost Demands of Display Applications (Cell Phone to HDTV)," *SID 06 Digest*, pp. 1543-1546 (2006).

*Primary Examiner* — Alexander S Beck
*Assistant Examiner* — Kirk Hermann
(74) *Attorney, Agent, or Firm* — Harness, Dickey & Pierce, P.L.C.

(57) ABSTRACT

An electric current driving display device includes pixel circuits, a scanning signal output circuit and a display signal output circuit. The pixel circuits include intersecting scanning lines and data lines. Each pixel circuit includes an electro-optical element and a drive element having a control terminal connected to the data line through a switching element. The scanning signal output circuit selects a write-target pixel circuit using the scanning line, and controls the selected pixel circuit outputs, to the data line, a voltage which depends on a threshold voltage of the drive element. The display signal output circuit applies, to the data line, a voltage obtained by adding or subtracting a correction voltage corresponding to the threshold voltage to or from a data voltage corresponding to display data, based on the voltage outputted to the data line.

10 Claims, 12 Drawing Sheets

(56) References Cited

U.S. PATENT DOCUMENTS

| | | | | |
|---|---|---|---|---|
| 2004/0108518 | A1 | 6/2004 | Jo | |
| 2004/0188761 | A1* | 9/2004 | Koyama | 257/348 |
| 2004/0239596 | A1 | 12/2004 | Ono et al. | |
| 2005/0168491 | A1* | 8/2005 | Takahara et al. | 345/690 |
| 2006/0061384 | A1* | 3/2006 | Azami et al. | 326/80 |
| 2006/0061560 | A1 | 3/2006 | Yamashita et al. | |
| 2006/0139253 | A1* | 6/2006 | Choi et al. | 345/76 |
| 2006/0221015 | A1* | 10/2006 | Shirasaki et al. | 345/77 |
| 2007/0057874 | A1 | 3/2007 | Le Roy et al. | |
| 2007/0152920 | A1* | 7/2007 | Yamashita et al. | 345/76 |
| 2008/0074362 | A1* | 3/2008 | Ogura | 345/77 |

FOREIGN PATENT DOCUMENTS

| | | |
|---|---|---|
| JP | 2004-133240 | 4/2004 |
| JP | 2004-252110 | 9/2004 |
| JP | 2005-128521 | 5/2005 |
| JP | 2005-352411 | 12/2005 |
| JP | 2006-84899 | 3/2006 |
| JP | 2006-301250 | 11/2006 |
| JP | 2008-107772 | 5/2008 |
| WO | WO 98/48403 | 10/1998 |
| WO | WO 2005/013250 | 2/2005 |

* cited by examiner

METHOD OF DRIVING AND A DRIVER FOR A DISPLAY DEVICE INCLUDING AN ELECTRIC CURRENT DRIVING ELEMENT

TECHNICAL FIELD

The present invention relates to display devices, more particularly, to display devices using an electric current driving element such as an organic EL display or an FED, and a method for driving the same.

BACKGROUND ART

Recently, there has been increased demand for thin and lightweight display devices achieving high-speed response. Therefore, there has been actively conducted research and development on organic EL (Electro Luminescence) displays and FEDs (Field Emission Displays).

An organic EL element included in an organic EL display emits light at higher luminance as a voltage to be applied thereto is high and an electric current flowing therethrough is large in amount. In the organic EL element, however, a relation between the luminance and the voltage varies readily due to influences such as a driving time and an ambient temperature. Consequently, it becomes very difficult to suppress the variations in luminance of the organic EL element if a driving scheme of a voltage control type is adopted for the organic EL display. In contrast to this, the luminance of the organic EL element is almost proportional to the electric current. This proportional relation is less susceptible to an influence of an extraneous factor such as an ambient temperature. Accordingly, it is preferable that a driving scheme of an electric current control type is adopted for the organic EL display.

Meanwhile, a display device includes a pixel circuit and a drive circuit each of which is configured using a TFT (Thin Film Transistor) made of amorphous silicon, low-temperature polycrystalline silicon, CG (Continuous Grain) silicon or the like. However, such a TFT has characteristics (e.g., threshold voltage, mobility) which vary readily. For this reason, a circuit that compensates the variations in characteristic of the TFT is provided for the pixel circuit of the organic EL display. Thus, the variations in luminance of the organic EL element are suppressed by action of this circuit.

In the driving scheme of the electric current drive type, a scheme for compensating variations in characteristic of a TFT is broadly divided into an electric current program scheme in which an amount of an electric current flowing through a driving TFT is controlled by an electric current signal and a voltage program scheme in which the amount of this electric current is controlled by a voltage signal. Use of the electric current program scheme allows compensation of variations in threshold voltage and mobility. Use of the voltage program scheme allows compensation of only the variations in threshold voltage.

However, the electric current program scheme has the following two problems. First, it is difficult to design a pixel circuit and a drive circuit since an electric current to be used herein is considerably small in amount. Second, it is difficult to make a large-area circuit since an influence of a parasitic capacity is exerted readily when an electric current signal is set. In contrast to this, according to the voltage program scheme, an influence of a parasitic capacity or the like is minute and a circuit is designed in a relatively ease manner. Moreover, an influence of variations in mobility to be exerted on an amount of an electric current is smaller than an influence of variations in threshold voltage to be exerted on the amount of the electric current. Further, the variations in mobility can be suppressed to a certain degree in a step of manufacturing a TFT. Accordingly, even a display device that adopts the voltage program scheme can provide satisfactory display quality.

With regard to an organic EL display that adopts the driving scheme of the electric current drive type, conventionally, there has been known the following pixel circuit. FIG. 11 is a circuit diagram showing a pixel circuit described in Patent Document 1. The pixel circuit 90 shown in FIG. 11 includes a driving TFT 91, switching TFTs 92 to 94, capacitors 95 and 96, and an organic EL element 97 (also referred to as an OLED (Organic Light Emitting Diode)). Each of the TFTs included in the pixel circuit 90 is of a P-channel type.

In the pixel circuit 90, the driving TFT 91, the switching TFT 94 and the organic EL element 97 are provided in series between a power supply wiring line Vp (potential: VDD) and a common cathode (GND). The capacitor 95 and the switching TFT 92 are provided in series between a gate terminal of the driving TFT 91 and a data line Sj. The switching TFT 93 is provided between the gate terminal and a drain terminal of the driving TFT 91, and the capacitor 96 is provided between the gate terminal of the driving TFT 91 and the power supply wiring line Vp. The switching TFT 92 has a gate terminal connected to a scanning line Gi, the switching TFT 93 has a gate terminal connected to an auto-zero line AZi and the switching TFT 94 has a gate terminal connected to an illumination line ILi.

FIG. 12 is a timing chart showing a timing that data is written to the pixel circuit 90. Prior to a time t0, a potential at the scanning line Gi and a potential at the auto-zero line AZi are controlled to a high level, respectively, a potential at the illumination line ILi is controlled to a low level, and a potential at the data line Sj is controlled to a reference potential Vstd. At the time t0, when the potential at the scanning line Gi is changed to the low level, the switching TFT 92 is changed to a conduction state. At a time t1, next, when the potential at the auto-zero line AZi is changed to the low level, the switching TFT 93 is changed to the conduction state. In the driving TFT 91, thus, the gate terminal and the drain terminal become equal in potential to each other.

At a time t2, next, when the potential at the illumination line ILi is changed to the high level, the switching TFT 94 is changed to a non-conduction state. Herein, an electric current flows from the power supply wiring line Vp into the gate terminal of the driving TFT 91 via the driving TFT 91 and the switching TFT 93. The potential at the gate terminal of the driving TFT 91 rises during a period that the driving TFT 91 is in the conduction state. The driving TFT 91 is changed to the non-conduction state when a gate-source voltage becomes a threshold voltage Vth (negative value) (i.e., when the potential at the gate terminal becomes (VDD+Vth)). Accordingly, the potential at the gate terminal of the driving TFT 91 rises to (VDD+Vth).

At a time t3, next, when the potential at the auto-zero line AZi is changed to the high level, the switching TFT 93 is changed to the non-conduction state. Herein, a difference in potential (VDD+Vth−Vstd) between the gate terminal of the driving TFT 91 and the data line Sj is held at the capacitor 95.

At a time t4, next, when the potential at the data line Sj is changed from the reference potential Vstd to a data potential Vdata, the potential at the gate terminal of the driving TFT 91 is changed by the same amount (Vdata−Vstd) and then becomes (VDD+Vth+Vdata−Vstd). At a time t5, next, when the potential at the scanning line Gi is changed to the high level, the switching TFT 92 is changed to the non-conduction state. Herein, the gate-source voltage (Vth+Vdata−Vstd) of the driving TFT 91 is held at the capacitor 96. At a time t6, next, the potential at the data line Sj is changed from the data potential Vdata to the reference potential Vstd.

At a time t7, next, when the potential at the illumination line ILi is changed to the low level, the switching TFT 94 is changed to the conduction state. Thus, an electric current flows from the power supply wiring line Vp into the organic EL element 97 via the driving TFT 91 and the switching TFT 94. An amount of the electric current flowing through the driving TFT 91 increases/decreases in accordance with the potential (VDD+Vth+Vdata−Vstd) at the gate terminal. However, the amount of the electric current is the same as long as the potential difference (Vdata−Vstd) is the same even when the threshold voltage Vth is different. Irrespective of the value of the threshold voltage Vth, accordingly, the electric current flows through the organic EL element 97 in an amount which depends on the potential Vdata, so that the organic EL element 97 emits light at a luminance which depends on the data potential Vdata.

In addition to this, with regard to the organic EL display, there have been known a method for providing a threshold value correction circuit outside a pixel circuit, and a method for setting a threshold value correction period longer than a period for selecting a pixel circuit. For example, Patent Document 2 describes the following method. That is, an electric current capability of a drive element is measured and is stored in a memory provided outside a pixel circuit, and a voltage to be supplied to a panel is changed in accordance with the stored electric current capability (see FIG. 13). Moreover, Patent Document 3 describes the following method. That is, a switch for applying an initial voltage to one end of a coupling capacitance is provided for setting a threshold value correction period longer than a selection period.

[Patent Document 1] International Publication No. 98/48403 Pamphlet

[Patent Document 2] Japanese Laid-Open Patent Publication No. 2002-278513

[Patent Document 3] Japanese Laid-Open Patent Publication No. 2004-133240

DISCLOSURE OF THE INVENTION

Problems to be Solved by the Invention

As described above, use of the pixel circuit 90 shown in FIG. 11 allows compensation of the variations in threshold voltage of the driving TFT 91 and allows light emission by the organic EL element 97 at a desired luminance. However, this pixel circuit (hereinafter, referred to as the conventional pixel circuit) has the following problems.

A first problem is that an amplitude of a data voltage can not be utilized efficiently. In the conventional pixel circuit, data is written by capacitance coupling. Consequently, even when a certain data voltage is written from an outside of the pixel circuit, a voltage to be applied actually as an overdrive voltage to the driving TFT becomes Cc/(Cc+Cs+Cgs) times as large as the written data voltage (where Cc represents a capacitance of the capacitor 95, Cs represents a capacitance of the capacitor 96 and Cgs represents a gate-source capacitance of the driving TFT 91). As described above, since the data voltage can not be utilized efficiently, power consumption in a data driver circuit is increased. When the coupling capacitance Cc is set to be considerably large, the amplitude of the data voltage can be utilized efficiently. However, the pixel circuit is disadvantageously increased in scale. In addition, there arises a problem that the parasitic capacitance Cgs, which can not be controlled with high accuracy, exerts an adverse influence on a drive voltage.

A second problem is that the threshold value correction is low in accuracy. As described above, since the actual drive voltage becomes Cc/(Cc+Cs+Cgs) times as large as the voltage applied from the outside, an effect of the threshold value correction also becomes Cc/(Cc+Cs+Cgs) times. Consequently, it is difficult to completely correct the threshold voltage.

A third problem is that the pixel circuit is increased in scale. As described above, when the coupling capacitance Cc is increased in order to deal with the parasitic capacitance, an area occupied by the capacitor 95 becomes large in the layout of the pixel circuit. Consequently, an aperture ratio is reduced in an organic EL display having a bottom emission configuration in which light is extracted from a bottom side of a substrate. Moreover, since the increase in circuit area results in reduction of a yield in manufacturing, the area of the pixel circuit must be decreased and the number of elements in the pixel circuit must be reduced.

A fourth problem is that an inspection in manufacturing becomes difficult. In the conventional pixel circuit, the gate terminal of the driving TFT is connected to the data line through the capacitor. Consequently, it is difficult to inspect the electric current, which flows through the driving TFT, via the data line. For this reason, it becomes difficult to improve a yield through to the inspection.

A fifth problem is that the threshold value correction period is restricted to a short time. In the conventional pixel circuit, the threshold value correction and the data write must be performed within the period for selecting the pixel circuit. The threshold value correction requires a time until the gate-source voltage of the diode-connected drive element sufficiently approximates the threshold voltage. In a display device with high definition, however, such a selection period is very short. For example, in a case where a panel having a resolution of VGA is driven at 60 frames/s, a selection period is set at about 30 μs. It is difficult to complete threshold value correction and data write within this short time.

According to the method described in Patent Document 2, the third problem can be solved. However, since the memory for storing the electric current capability of each drive element is provided, a cost of a peripheral circuit and a layout area are increased. According to the method described in Patent Document 3, moreover, the fifth problem can be solved. However, since the switch for applying the initial voltage is provided, the pixel circuit is further increased in scale.

Hence, an object of the present invention is to provide a display device that efficiently utilizes an amplitude of a data voltage and performs threshold value correction with high accuracy, without increasing a scale of a pixel circuit.

Means for Solving the Problems

A first aspect of the present invention is a display device of an electric current driving type, including: a plurality of pixel circuits arranged in correspondence with intersections of a plurality of scanning lines and a plurality of data lines, each pixel circuit including an electro-optical element and a drive element having a control terminal connected to the data line through a switching element; a scanning signal output circuit selecting a write-target pixel circuit through use of the scanning line, and exercising control such that the selected pixel circuit outputs, to the data line, a voltage which depends on a threshold voltage of the drive element; and a display signal output circuit applying, to the data line, a voltage obtained by adding or subtracting a correction voltage corresponding to the threshold voltage to or from a data voltage corresponding to display data, based on the voltage outputted to the data line.

A second aspect of the present invention is the display device according to the first aspect of the present invention, wherein the electro-optical element and the drive element are provided in series between two power supply wiring lines in the pixel circuit, and the pixel circuit further includes a first switching element connected to a control terminal of the drive element and the data line, a second switching element provided between the control terminal and one conductive terminal of the drive element, a third switching element provided together with the electro-optical element and the drive element in series between the power supply wiring lines, and a capacitance having one end connected to the control terminal of the drive element.

A third aspect of the present invention is the display device according to the second aspect of the present invention, wherein the scanning signal output circuit controls the write-target pixel circuit such that the first and second switching elements are set at a conduction state, the third switching element is set at a non-conduction state, next, the second switching element is changed to the non-conduction state, then, the first switching element is changed to the non-conduction state and the third switching element is changed to the conduction state, and the display signal output circuit applies, to the data line, the voltage obtained by adding or subtracting the correction voltage to or from the data voltage after the second switching element is changed to the non-conduction state, based on a voltage of the data line in the case where the second switching element is in the conduction state.

A fourth aspect of the present invention is the display device according to the second aspect of the present invention, wherein each of the drive element and the first to third switching elements is a thin film transistor, one of the first and third switching elements is of a P-channel type and the other switching element is of an N-channel type, and the first and third switching elements have control terminals connected to a common wiring line.

A fifth aspect of the present invention is the display device according to the second aspect of the present invention, wherein each of the drive element and the first to third switching elements is a thin film transistor, one of the second and third switching elements is of a P-channel type and the other switching element is of an N-channel type, and the second and third switching elements have control terminals connected to a common wiring line.

A sixth aspect of the present invention is the display device according to the second aspect of the present invention, wherein the drive element is an enhancement P-channel type transistor, and the pixel circuit selected by the scanning signal output circuit outputs, to the data line, a voltage obtained by subtracting an absolute value of the voltage which depends on the threshold voltage of the drive element from a higher one of voltages of the power supply wiring lines.

A seventh aspect of the present invention is the display device according to the second aspect of the present invention, wherein the drive element is an enhancement N-channel type transistor, and the pixel circuit selected by the scanning signal output circuit outputs, to the data line, a voltage obtained by adding an absolute value of the voltage which depends on the threshold voltage of the drive element to a lower one of voltages of the power supply wiring lines.

An eighth aspect of the present invention is the display device according to the second aspect of the present invention, wherein the display signal output circuit applies a predetermined constant voltage to the data line at a part of a conduction period of the first switching element.

A ninth aspect of the present invention is the display device according to the first aspect of the present invention, wherein the display signal output circuit includes a plurality of analog buffers, and a plurality of correcting capacitances and a plurality of switch circuits provided for each data line, and the switch circuit switches between a state that one electrode of the correcting capacitance is connected to the data line and the other electrode thereof is applied with a predetermined constant voltage and a state that one electrode of the correcting capacitance is connected to the data line through the analog buffer and the other electrode thereof is applied with the data voltage.

A tenth aspect of the present invention is the display device according to the ninth aspect of the present invention, wherein the analog buffer is provided for the plurality of data lines.

An eleventh aspect of the present invention is a method for driving a display device including a plurality of pixel circuits arranged in correspondence with intersections of a plurality of scanning lines and a plurality of data lines, each pixel circuit including an electro-optical element and a drive element having a control terminal connected to the data line through a switching element, the method including the steps of: selecting a write-target pixel circuit through use of the scanning line, and exercising control such that the selected pixel circuit outputs, to the data line, a voltage which depends on a threshold voltage of the drive element; and applying, to the data line, a voltage obtained by adding or subtracting a correction voltage corresponding to the threshold voltage to or from a data voltage corresponding to display data, based on the voltage outputted to the data line.

Effects of the Invention

According to the first or eleventh aspect of the present invention, it is possible to read the voltage which depends on the threshold voltage of the drive element from the selected pixel circuit and to apply, to the control terminal of the drive element, the voltage obtained by adding or subtracting the correction voltage (the voltage corresponding to the threshold voltage) to or from the data voltage. Accordingly, it is possible to detect the threshold voltage of the drive element to compensate variations in threshold voltage, and to allow the electro-optical element to emit light at a desired luminance. Moreover, the threshold value correction circuit is provided outside the pixel circuit and the threshold voltage is detected by use of the data line, leading to reduction in scale and area of the pixel circuit. Further, the threshold voltage is detected as a voltage signal, so that a current-voltage conversion element becomes unnecessary unlike a case where an electric current signal is fed back. Therefore, variations in correction effect can be suppressed. Moreover, a desired voltage is applied to the control terminal of the drive element through no coupling capacitance. Therefore, it is possible to efficiently utilize an amplitude of the data voltage and to reduce power consumption.

According to the second aspect of the present invention, it is possible to reduce the capacitance to be used for threshold value correction, to improve an aperture ratio and a yield, and to reduce power consumption.

According to the third aspect of the present invention, it is possible to divide the period for selecting the pixel circuit into a period for detecting the threshold voltage and a period for writing the corrected data voltage, and to allow commonality of a feedback line for reading the threshold voltage and a data line for writing the data.

According to the fourth or fifth aspect of the present invention, it is possible to reduce the number of wiring lines in such a manner that the first to third switching elements share the wiring line to be connected to the control terminals thereof. Thus, it is possible to make an aperture ratio of a pixel higher.

According to the sixth aspect of the present invention, the variations in threshold voltage can be compensated in the drive element of the P-channel type when the voltage obtained by subtraction of the absolute value of the threshold voltage is applied to the control terminal. Therefore, it is possible to compensate the variations in threshold voltage of the drive element by use of the voltage outputted from the selected pixel circuit.

According to the seventh aspect of the present invention, the variations in threshold voltage can be compensated in the drive element of the N-channel type when the voltage obtained by addition of the absolute value of the threshold voltage is applied to the control terminal. Therefore, it is possible to compensate the variations in threshold voltage of the drive element by use of the voltage outputted from the selected pixel circuit.

According to the eighth aspect of the present invention, the suitable constant voltage is applied to the control terminal of the drive element. Thus, it is possible to reduce a time which is required until the voltage which depends on the threshold voltage of the drive element is outputted to the data line. Accordingly, it is possible to suppress variations in correction effect and to improve image quality even when the threshold value correction period is short.

According to the ninth aspect of the present invention, the display signal output circuit can apply, to the data line, the voltage obtained by adding "the difference between the data voltage and the constant voltage" to the voltage of the data line. Accordingly, when the constant voltage is determined appropriately, the voltage obtained by adding or subtracting the correction voltage (the voltage corresponding to the threshold voltage of the drive element) to or from the data voltage can be applied to the data line, based on the voltage outputted from the pixel circuit to the data line. Moreover, this addition or subtraction is performed outside the pixel circuit, leading to reduction in scale of the pixel circuit. Further, the analog buffer is provided between the correcting capacitance and the data line. Thus, it is possible to suppress attenuation due to coupling of the voltage held at the correcting capacitance and to realize high image quality.

According to the tenth aspect of the present invention, it is possible to realize a display panel with high definition in such a manner that the analog buffer having a large circuit scale is not arranged for each data line, but is arranged for the plurality of data lines.

DESCRIPTION OF REFERENCE SYMBOLS

Figure 1:
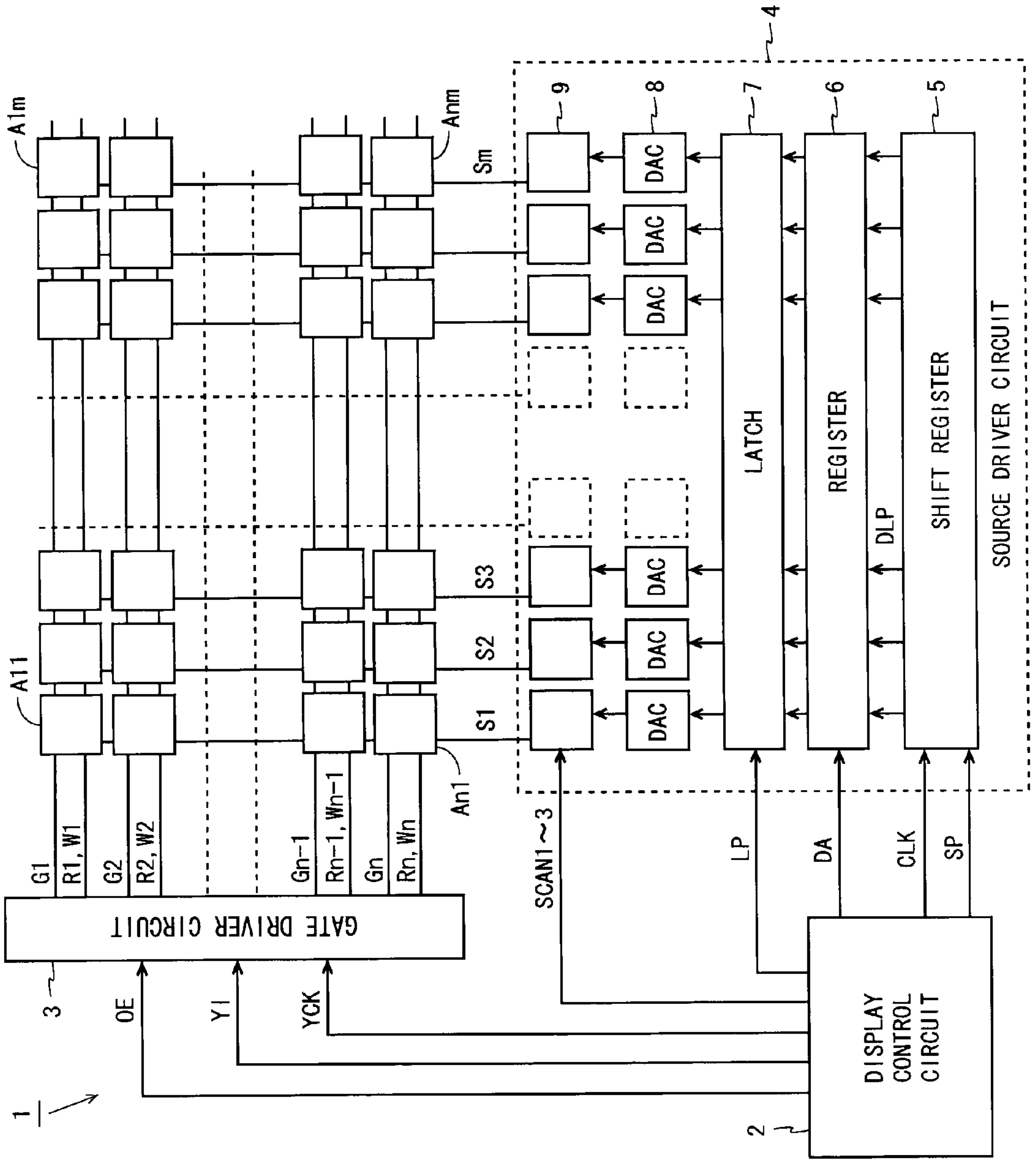
FIG. 1 is a block diagram showing a configuration of display devices according to first to third embodiments of the present invention.

1 Display device
2 Display control circuit
3 Gate driver circuit
4 Source driver circuit
5 Shift register
6 Register
7 Latch
8 D/A converter
9, 20, 50, 60 Threshold value correction circuit
Aij, 10, 17, 18, 40 Pixel circuit
11, 41 Driving TFT
12 to 14, 42 to 44 Switching TFT
15, 45 Organic EL element
16, 26, 46 Capacitor
21 to 25, 61 Switch
27 Analog buffer

BEST MODE FOR CARRYING OUT THE INVENTION

With reference to FIGS. 1 to 10, description will be given of display devices according to first to third embodiments of the present invention. The display device to be described below includes a pixel circuit including an electro-optical element and a plurality of switching elements. The switching elements included in the pixel circuit may be a low-temperature polysilicon TFT, a CG silicon TFT, an amorphous silicon TFT, and the like. A configuration and a fabrication process of such a TFT are well-known; therefore, description thereof will not be given here. Moreover, it is assumed herein that the electro-optical element included in the pixel circuit is an organic EL element. A configuration of such an organic EL element is also well-known; therefore, description thereof will not be given here. In the following, first, description will be given of a common overall configuration of the display devices according to the first to third embodiments. Thereafter, description will be given of a pixel circuit and a threshold value correction circuit in the display device according to each embodiment.

(Overall Configuration of Display Device)

FIG. 1 is a block diagram showing the configuration of the display devices according to the first to third embodiments of the present invention. The display device 1 shown in FIG. 1 includes a plurality of pixel circuits Aij (i: an integer in a range between 1 or more and n or less, j: an integer in a range between 1 or more and m or less), a display control circuit 2, a gate driver circuit 3 and a source driver circuit 4. The gate driver circuit 3 functions as a scanning signal output circuit, and the source driver circuit 4 functions as a display signal output circuit.

The display device 1 also includes a plurality of scanning lines Gi which are provided in parallel with one another, and a plurality of data lines Sj which are provided in parallel with one another so as to be orthogonal to the plurality of scanning lines Gi. The pixel circuits Aij are arranged in a matrix form in correspondence with intersections of the scanning lines Gi and the data lines Sj. Moreover, a plurality of control lines Wi and a plurality of control lines Ri are arranged in parallel with the scanning lines Gi so as to be parallel with one another. The scanning lines Gi and the control lines Wi and Ri are connected to the gate driver circuit 3, and the data lines Sj are connected to the source driver circuit 4. In the arrangement region of the pixel circuits Aij, further, a power supply wiring line Vp and a common cathode Vcom, which are not shown in the figure, are arranged. Herein, cathode wiring lines CAi may be arranged in place of the common cathode Vcom.

The display control circuit 2 outputs a timing signal OE, a start pulse YI and a clock YCK to the gate driver circuit 3, and outputs a start pulse SP, a clock CLK, display data DA and a latch pulse LP to the source driver circuit 4. Moreover, the display control circuit 2 controls potentials at control lines SCAN1 to SCAN3 of the source driver circuit 4.

The gate driver circuit 3 includes a shift register circuit, a logic operation circuit and a buffer (each of which is not shown in the figure). The shift register circuit sequentially transfers the start pulse YI in synchronization with the clock YCK. The logic operation circuit performs a logic operation between a pulse outputted from each stage of the shift register circuit and the timing signal OE. An output from the logic operation circuit is given to each of the corresponding scanning line Gi and the corresponding control lines Wi and Ri via the buffer. Herein, “m” pixel circuits Aij are connected to one scanning line Gi. The “m” pixel circuits Aij are selected collectively by use of the scanning line Gi.

The source driver circuit 4 includes an “m”-bit shift register 5, a register 6, a latch 7, “m” D/A converters 8 and “m” threshold value correction circuits 9. The source driver circuit 4 performs a line sequential scan wherein data is transmitted to the pixel circuits Aij in one row at a single timing. More specifically, the shift register 5 has cascade-connected “m” registers. The shift register 5 transfers the start pulse SP supplied to the register on a first stage in synchronization with the clock CLK, and outputs timing pulses DLP from the registers on the respective stages. The display data DA is supplied to the register 6 at an output timing of the timing pulse DLP. The register 6 stores the display data DA in accordance with the timing pulse DLP. When the register 6 stores the display data DA corresponding to one row, the display control circuit 2 outputs the latch pulse LP to the latch 7. The latch 7 receives the latch pulse LP and then holds the display data stored in the register 6.

The D/A converters 8 and the threshold value correction circuits 9 are provided in correspondence with the data lines Sj. The D/A converter 8 converts the display data held by the latch 7 to an analog signal voltage, and outputs the analog signal voltage to the corresponding threshold value correction circuit 9. The threshold value correction circuit 9 receives, via the data line Sj, a voltage outputted from the pixel circuit Aij selected by the gate driver circuit 3 (i.e., a voltage which depends on a threshold voltage of a driving TFT). Based on this voltage, the threshold value correction circuit 9 applies, to the data line Sj, a voltage obtained by adding or subtracting a correction voltage corresponding to the threshold voltage of the driving TFT to or from the output voltage of the D/A converter 8. Thus, variations in threshold voltage of the driving TFT included in the pixel circuit Aij can be compensated by action of the threshold value correction circuit 9 (details thereof will be described later).

In place of the line sequential scan, herein, the source driver circuit 4 may perform a dot sequential scan wherein data is sequentially transmitted to each pixel circuit. When the dot sequential scan is performed, a voltage of the data line Sj is held by a capacitance of the data line Sj during a period that a certain scanning line Gi is selected. A configuration of the source driver circuit that performs such a dot sequential scan is well-known; therefore, description thereof will not be given here.

First Embodiment

Figure 2:
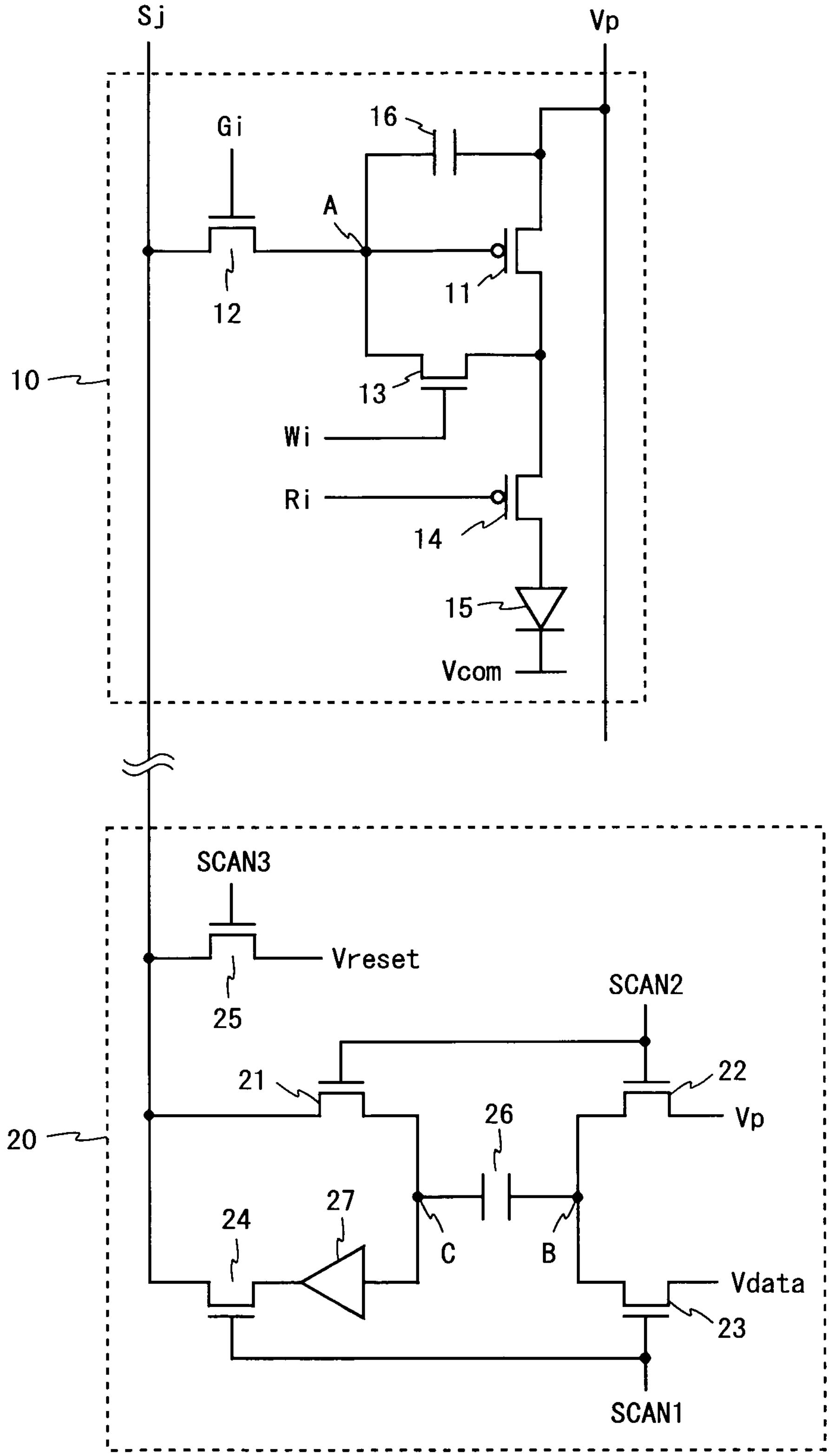
FIG. 2 is a circuit diagram showing a pixel circuit and a threshold value correction circuit each included in the display device according to the first embodiment of the present invention.

FIG. 2 is a circuit diagram showing the pixel circuit and the threshold value correction circuit each included in the display device according to the first embodiment of the present invention. The pixel circuit 10 and the threshold value correction circuit 20 in FIG. 2 correspond to the pixel circuit Aij and the threshold value correction circuit 9 in FIG. 1. As shown in FIG. 2, the pixel circuit 10 includes a driving TFT 11, switching TFTs 12 to 14, an organic EL element 15 and a capacitor 16. The driving TFT 11 is of an enhancement P-channel type, each of the switching TFTs 12 and 13 is of an N-channel type, and the switching TFT 14 is of a P-channel type.

The pixel circuit 10 is connected to the power supply wiring line Vp, the common cathode Vcom, the scanning line Gi, the control line Wi, the control line Ri and the data line Sj. Hereinafter, a potential at the power supply wiring line Vp is represented by VDD and a potential at the common cathode Vcom is represented by VSS (herein, VDD>VSS). The common cathode Vcom serves as a common electrode of all the organic EL elements 15 in the display device.

In the pixel circuit 10, the driving TFT 11, the switching TFT 14 and the organic EL element 15 are provided in series between the power supply wiring line Vp and the common cathode Vcom sequentially from a side of the power supply wiring line Vp. The switching TFT 12 is provided between a gate terminal of the driving TFT 11 and the data line Sj. The switching TFT 13 is provided between the gate terminal and a drain terminal of the driving TFT 11, and the capacitor 16 is provided between the gate terminal of the driving TFT 11 and the power supply wiring line Vp. The switching TFT 12 has a gate terminal connected to the scanning line Gi, the switching TFT 13 has a gate terminal connected to the control line Wi and the switching TFT 14 has a gate terminal connected to the control line Ri. A potential at each of the scanning line Gi, the control line Wi and the control line Ri is controlled by the gate driver circuit 3, and a potential at the data line Sj is controlled by the source driver circuit 4. Hereinafter, a node to be connected to the gate terminal of the driving TFT 11 is represented by A.

The threshold value correction circuit 20 includes switches 21 to 25, a capacitor 26 and an analog buffer 27, and is connected to the data line Sj. Each of the switches 21 to 25 is an N-channel type transistor, and the analog buffer 27 is a voltage follower circuit (a unity gain amplifier).

A node to be connected to a first electrode (an electrode illustrated at a right side in FIG. 2) of the capacitor 26 is represented by B, and anode to be connected to a second electrode of the capacitor 26 is represented by C. The switch 21 is provided between the data line Sj and the node C, and the switch 22 is provided between the node B and the power supply wiring line Vp. The switch 23 has a first end connected to the node B. The analog buffer 27 and the switch 24 are provided in series between the node C and the data line Sj sequentially from a side of the node C. The switch 25 has a first end connected to the data line Sj.

The switch 23 has a second end to which the data voltage Vdata outputted from the D/A converter 8 is applied. The switch 25 has a second end to which an initial voltage Vreset (details thereof will be described later) is applied. The switches 21 and 22 have gate terminals connected to the control line SCAN2, respectively. The switches 23 and 24 have gate terminals connected to the control line SCAN1, respectively. The switch 25 has a gate terminal connected to the control line SCAN3.

Hereinafter, a threshold voltage of the driving TFT 11 is represented by Vth (negative value). As will be described later, the capacitor 26 functions as a correcting capacitance that holds a correction voltage Vx corresponding to the threshold voltage Vth of the driving TFT 11. Moreover, the switches 21 to 24 function as a switch circuit that switches between a state that the data line Sj is connected with the first electrode of the capacitor 26 and a constant voltage VDD is applied to the second electrode of the capacitor 26 and a state that the data line Sj is connected with the first electrode of the capacitor 26 through the analog buffer 27 and the data voltage Vdata is applied to the second electrode of the capacitor 26.

Figure 3:
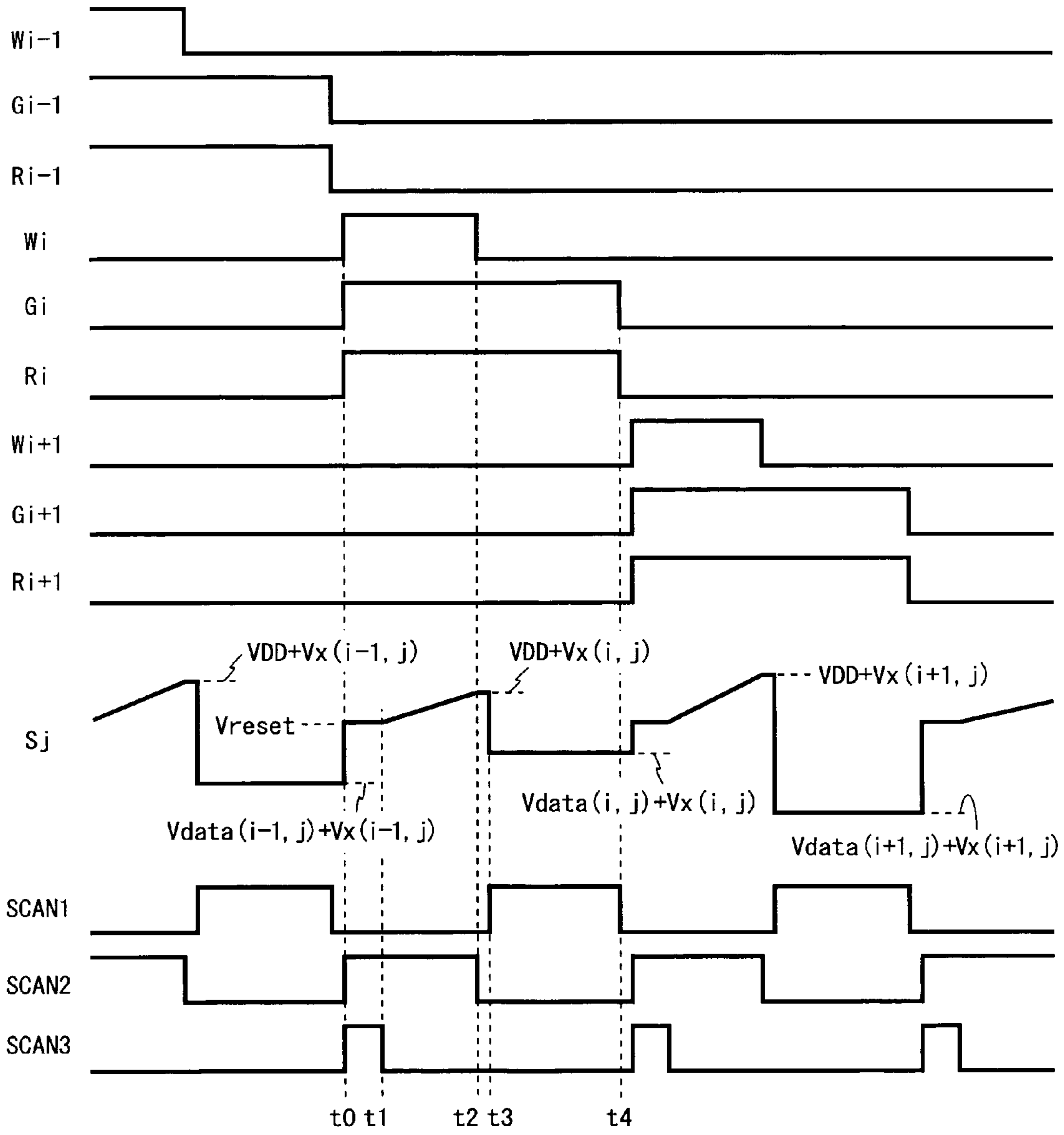
FIG. 3 is a timing chart showing a timing that data is written to the pixel circuit in the display device according to the first embodiment of the present invention.

FIG. 3 is a timing chart showing a timing that data is written to the pixel circuit 10. With reference to FIG. 3, hereinafter, description will be given of operations to be performed at the time when the data voltage Vdata is written to the pixel circuit 10 connected to the scanning line Gi and the data line Sj. In FIG. 3, a period from a time t0 to a time t4 corresponds to a period for selecting the pixel circuit 10. Prior to a time t2, a process of detecting the threshold voltage of the driving TFT 11 is performed. Subsequent to the time t2, a process of writing the corrected data voltage is performed.

Prior to the time t0, the potential at each of the scanning line Gi, the control line Wi and the control line Ri is controlled to a low level, each of the switching TFTs 12 and 13 is in a non-conduction state, and the switching TFT 14 is in a conduction state. Herein, the driving TFT 11 is in the conduction state, and an electric current flows from the power supply wiring line Vp into the organic EL element 15 via the driving TFT 11 and the switching TFT 14, so that the organic EL element 15 emits light.

At the time t0, when the potential at each of the scanning line Gi, the control line Ri, the control line Wi and the control line SCAN3 is changed to a high level, each of the switching TFT 12, the switching TFT 13 and the switch 25 is changed to the conduction state while the switching TFT 14 is changed to the non-conduction state. Thus, the initial voltage Vreset is applied to the data line Sj, and a potential at each of the data line Sj and the node A becomes Vreset. Subsequent to the time t0, the electric current passing through the driving TFT 11 is fed into the node A via the switching TFT 13.

At a time t1, next, when the potential at the control line SCAN3 is changed to the low level, the switch 25 is changed to the non-conduction state. Also subsequent to the time t1, the electric current passing through the driving TFT 11 is fed into the node A via the switching TFT 13, and a potential at the node A (a potential at the gate terminal of the driving TFT 11) rises during a period that the driving TFT 11 is in the conduction state. Herein, since the switching TFT 12 is in the conduction state, the potential at the data line Sj is equal to the potential at the node A.

During a period from the time t0 to the time t2, the potential at the control line SCAN1 is controlled to the low level while the potential at the control line SCAN2 is controlled to the high level. Therefore, each of the switches 21 and 22 is changed to the conduction state while each of the switches 23 and 24 is changed to the non-conduction state. Moreover, the node B is connected to the power supply wiring line Vp and the node C is connected to the data line Sj. Accordingly, the potential at the node B is VDD, and the potential at the node C is equal to the potential at the node A and the potential at the data line Sj.

At the time t2, next, when the potential at each of the control line Wi and the control line SCAN2 is changed to the low level, each of the switching TFT 13, the switch 21 and the switch 22 is changed to the non-conduction state. At the time t2, the potential at the node A is assumed to be (VDD+Vx) (herein, Vx is a negative value, and Vx has an absolute value which is larger than an absolute value of Vth). At the time t2, the potential at the node C is also (VDD+Vx). Therefore, when each of the switches 21 and 22 is changed to the non-conduction state at the time t2, the voltage Vx is held at the capacitor 26.

As described above, the potential at the node A rises during the period that the driving TFT 11 is in the conduction state. Accordingly, a satisfactory time allows the potential at the node A to rise until the gate-source voltage of the driving TFT 11 becomes the threshold voltage Vth (negative value) and, finally, reaches (VDD+Vth). At the time t2, the potential (VDD+Vx) at the node A is lower than (VDD+Vth). Moreover, the voltage Vx varies in accordance with the threshold voltage Vth. The absolute value of the voltage Vx becomes larger as the absolute value of the threshold voltage Vth is large.

At a time t3, next, when the potential at the control line SCAN1 is changed to the high level, each of the switches 23 and 24 is changed to the conduction state. Subsequent to the time t3, the data voltage Vdata outputted from the D/A converter 8 is applied to the node B, and the node C is connected to the data line Sj through the analog buffer 27. When the potential at the node B is changed from VDD to Vdata during the period that the voltage Vx is held at the capacitor 26, the potential at the node C is also changed by the same amount (Vdata−VDD) and becomes (VDD+Vx)+(Vdata−VDD)=(Vdata+Vx).

Herein, the switch 24 is in the conduction state, and an input voltage and an output voltage are equal to each other in the analog buffer 27. Therefore, the potential at the data line Sj becomes (Vdata+Vx) as in the case of the node C. Moreover, since the switching TFT 12 is also in the conduction state, the potential at the node A also becomes (Vdata+Vx) as in the case of the data line Sj.

At the time t4, next, when the potential at each of the scanning line Gi, the control line Ri and the control line SCAN1 is changed to the low level, each of the switching TFT 12, the switch 23 and the switch 24 is changed to the non-conduction state while the switching TFT 14 is changed to the conduction state. Herein, the gate-source voltage (VDD−Vdata−Vx) of the driving TFT 11 is held at the capacitor 16. Moreover, an ON potential (low level potential) to be given to the control line Ri is determined such that the switching TFT 14 is operated in a linear region.

Subsequent to the time t4, the voltage held at the capacitor 16 is not changed; therefore, the potential at the node A is maintained at (Vdata+Vx). Subsequent to the time t4, accordingly, an electric current flows from the power supply wiring line Vp into the organic EL element 15 via the driving TFT 11 and the switching TFT 14 until the potential at the control line Ri becomes the high level again, so that the organic EL element 15 emits light. Herein, an amount of the electric current, which flows through the driving TFT 11, increases/decreases in accordance with the potential (Vdata+Vx) at the node A. As will be described later, however, this electric current amount is the same as long as the potential Vdata is the same even when the threshold voltage Vth is different.

In a case where the driving TFT 11 is operated in a saturated region, a drain-source electric current $I_{EL}$ is obtained from the following equation (1) if a channel length modulation effect is neglected.

$$I_{EL}=-\tfrac{1}{2}\cdot W/L\cdot Cox\cdot\mu(Vg-VDD-Vth)^2 \tag{1}$$

In the equation (1), W/L represents an aspect ratio of the driving TFT 11, Cox represents a gate capacitance, μ represents a mobility, and Vg represents a gate terminal potential (i.e., the potential at the node A).

Typically, the electric current $I_{EL}$ expressed by the equation (1) varies in accordance with the threshold voltage Vth. In the display device according to this embodiment, the gate terminal potential Vg becomes (Vdata+Vx); therefore, the electric current $I_{EL}$ is changed as expressed by the following equation (2).

$$I_{EL}=-\tfrac{1}{2}\cdot W/L\cdot Cox\cdot\mu\{V\text{data}-VDD+(Vx-Vth)\}^2 \tag{2}$$

In the equation (2), when the voltage Vx matches with the threshold voltage Vth, the electric current $I_{EL}$ does not depend on the threshold voltage Vth. Moreover, even when the voltage Vx does not match with the threshold voltage Vth, the electric current $I_{EL}$ does not depend on the threshold voltage Vth as long as a difference between the voltage Vx and the threshold voltage Vth is fixed.

In the display device according to this embodiment, the length of the threshold value correction period (the period from the time t1 to the time t2) and the level of the initial voltage Vreset are determined such that the difference between voltages Vx of two TFTs becomes almost equal to the difference between the threshold voltages Vth of the two TFTs. Thus, the voltage difference (Vx−Vth) in the equation (2) is almost fixed. Accordingly, an electric current flows into the organic EL element 15 in an amount which depends on the data voltage Vdata irrespective of a value of the threshold voltage Vth, so that the organic EL element 15 emits light at a luminance which depends on the data voltage Vdata. In the display device according to this embodiment, the threshold value correction is performed by the threshold value correction circuit 20 provided outside the pixel circuit 10. There is no necessity that the threshold value correction circuit 20 includes a complicated logic circuit and a memory.

Herein, description will be given of the initial voltage Vreset. When the switching TFT 13 is changed to the conduction state at the time t0 shown in FIG. 3, the driving TFT 11 is changed to a diode-connected state. In a conventional organic EL display, a period from a timing that a driving TFT is changed to a diode-connected state to a timing that a gate-source voltage Vgs of the driving TFT satisfactorily approximates a threshold voltage Vth corresponds to a threshold value correction period. When the voltage Vgs satisfactorily approximates the threshold voltage Vth, a difference in threshold voltage between the two driving TFTs can be detected.

In a display device with high definition, however, a period for selecting a pixel circuit is short. Consequently, a voltage Vgs fails to satisfactorily approximate a threshold voltage Vth within the selection period in some instances. In the display device according to this embodiment, particularly, the parasitic capacitance of the capacitor 26 and the parasitic capacitance of the data line Sj must be charged electrically in order to detect the threshold voltage Vth of the driving TFT 11. Therefore, some contrivance must be made in order to perform the process of detecting the threshold voltage and the process of writing the corrected data voltage within the selection period.

In the display device according to this embodiment, therefore, the constant initial voltage Vreset is applied to the data line Sj by action of the switch 25 in order to detect variations in threshold voltage Vth prior to start of the process of writing the corrected data voltage. Thus, it is possible to reduce a time which is required until the voltage (VDD+Vx) which depends on the threshold voltage Vth of the driving TFT 11 is outputted to the data line Sj. Accordingly, it is possible to suppress variations in correction effect and to improve image quality even when the threshold value correction period is short.

The initial voltage Vreset is determined based on the length of the threshold value correction period, the accuracy to be required for the threshold value correction, and the like. In a case where the switching TFT 13 is in the conduction state and the driving TFT 11 is in the diode-connected state, the following equation (3) is established with regard to an electric current balance in the driving TFT 11.

$$k(Vgs(t)-Vth)^2=-C\frac{dVgs(t)}{dt} \tag{3}$$

In the equation (3), k represents a constant, and C represents a sum of a holding capacitance and a signal line capacitance.

The following equation (4) is obtained by solving this differential equation.

$$Vgs(t)=\frac{1}{\frac{k}{C}t+\frac{1}{Vgs0-Vth}}+Vth \tag{4}$$

In the equation (4), Vgs0 represents an initial value of the voltage Vgs.

Herein, attention is given to two TFTs which are different in threshold voltage from each other by ΔVth. If a difference in voltage Vgs between the two TFTs approximates ΔVth after a lapse of a predetermined time, the threshold voltage of each TFT can be detected. This difference in voltage Vgs is obtained from the following equation (5).

$$\Delta Vgs(t)=\Delta Vth+\frac{1}{\frac{k}{C}t+\frac{1}{Vgs0-Vth-\Delta Vth}}-\frac{1}{\frac{k}{C}t+\frac{1}{Vgs0-Vth}} \tag{5}$$

Accordingly, it is preferable that the initial value Vgs0 of the voltage Vgs is determined such that ΔVgs(t) in the equation (5) satisfactorily approximates ΔVth within a permissible time, and the initial voltage Vreset is obtained in accordance with the initial value Vgs0.

Figure 4:
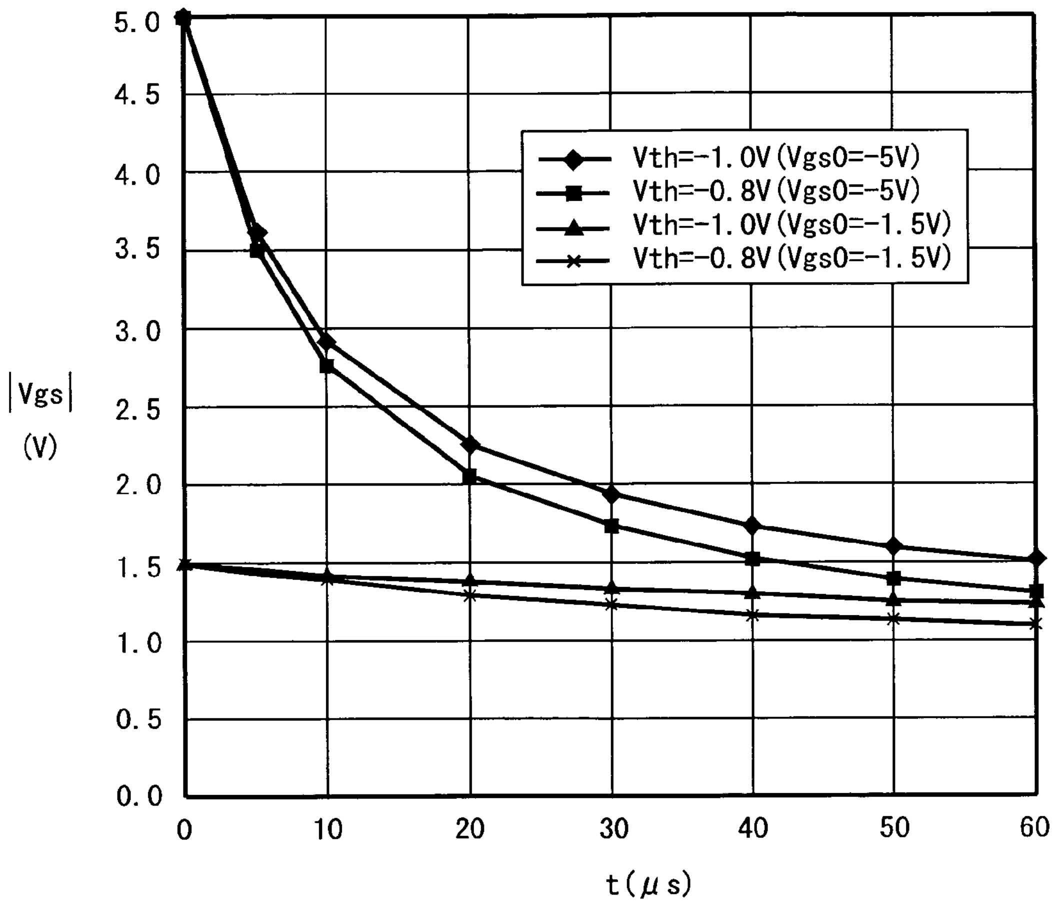
FIG. 4 shows an example of a temporal change in gate-source voltage of a diode-connected TFT.

FIG. 4 shows an example of a temporal change in gate-source voltage Vgs of the diode-connected driving TFT. FIG. 4 shows a result obtained when two different initial voltages Vgs0(Vgs0=−5 V, Vgs0=−1.5 V) are applied to two TFTs (Vth=−0.8 V, Vth=−1.0 V) which are different in threshold voltage from each other.

The initial voltage Vgs0 is applied to each of the two TFTs, and the voltages Vgs of the respective TFTs are compared with each other after a lapse of 30 μs. In the case of Vgs0=−5 V, the two voltages are different from final values (−0.8 V and −1.0 V) thereof, respectively, after the lapse of 30 μs. However, a difference between the two voltages is almost equal to a final value (0.2 V) thereof at this time. In the case of Vgs0=−1.5 V, on the other hand, the two voltages approximate the respective final values after the lapse of 30 μs. However, the difference between the two voltages is different from the final value thereof at this time.

As described above, as an absolute value of the initial voltage Vgs0 is large, the difference between the two voltages Vgs is increased more promptly; therefore, the threshold value correction period can be made short. In order to perform the threshold value correction with high accuracy, accordingly, it is preferable that the absolute value of the initial voltage Vgs0 is made large. On the other hand, when the absolute value of the initial voltage Vgs0 is made large, power consumption is increased due to electric charge/discharge in the data line Sj and the capacitor 26. Accordingly, it is preferable that the initial voltage Vreset is determined in consideration of a degree and a specification of variations in threshold voltage due to a process.

Next, description will be given of the analog buffer 27. In a case where the capacitance of the data line Sj is smaller than the capacitance of the capacitor 26 to an ignorable level, there is no necessity that the threshold value correction circuit 20 includes the analog buffer 27. In a display panel having a size of not less than several inches, on the other hand, a capacitance of a data line Sj is not less than several pF in many instances. In such a case, therefore, the analog buffer 27 must be provided. Herein, use of a voltage follower circuit (a unity gain amplifier) as the analog buffer 27 allows enhancement of a driving capability while suppressing an increase of a circuit scale as much as possible.

Moreover, in a case where a typical differential amplifier is used as the analog buffer 27, a transistor that forms a differential pair varies in characteristic, so that the analog buffer 27 varies in characteristic. If there occur such variations, stripe-shaped ghosts appear in a display screen, resulting in degradation of display quality. In order to prevent such a disadvantage, it is preferable that the analog buffer 27 is not formed on the display panel, but is incorporated in a peripheral IC provided outside the display panel. Typically, the circuit incorporated in the peripheral IC is formed with a transistor made of polycrystalline silicon. Accordingly, when the analog buffer 27 is incorporated in the peripheral IC, the variations in characteristic can be made considerably small.

In order to prevent the disadvantage described above, moreover, a buffer having an offset cancel function (see FIGS. 5A to 5D) may be used as the analog buffer 27. In the buffer shown in FIG. 5A, a differential amplifier 31 has a positive-side input terminal connected to an input terminal of the buffer, a negative-side input terminal connected to a first electrode of a capacitor 32, and an output terminal connected to an output terminal of the buffer. A switch 33 is provided between a second electrode of the capacitor 32 and an input terminal of the buffer. A switch 34 is provided between the negative-side input terminal and the output terminal of the differential amplifier 31. A switch 35 is provided between the second electrode of the capacitor 32 and the output terminal of the differential amplifier 31. Each of the switches 33 and 34 is controlled by a control signal SC_A while the switch 35 is controlled by a control signal SC_B.

Figure 5A:
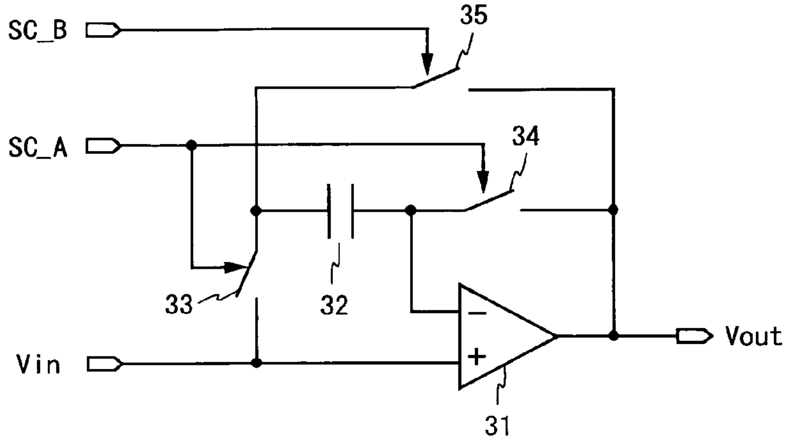
FIG. 5A is a circuit diagram showing a buffer having an offset cancel function.
Figure 5B:
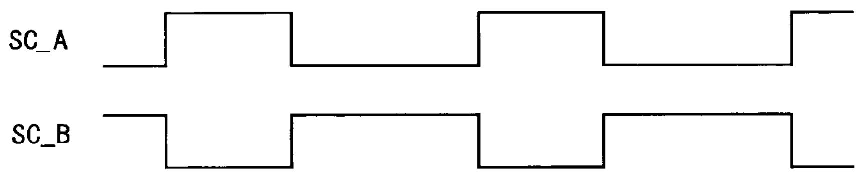
FIG. 5B is a timing chart for the buffer shown in FIG. 5A.
Figure 5C:
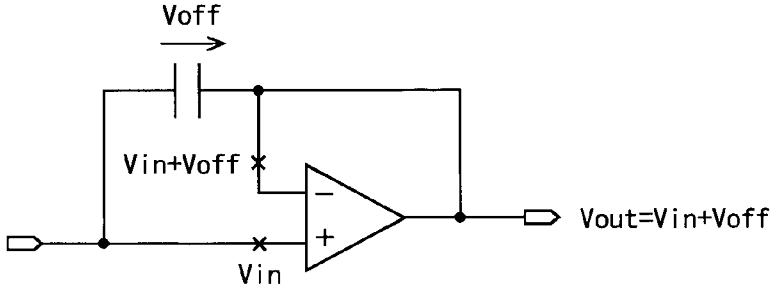
FIG. 5C shows operations of the buffer shown in FIG. 5A.
Figure 5D:
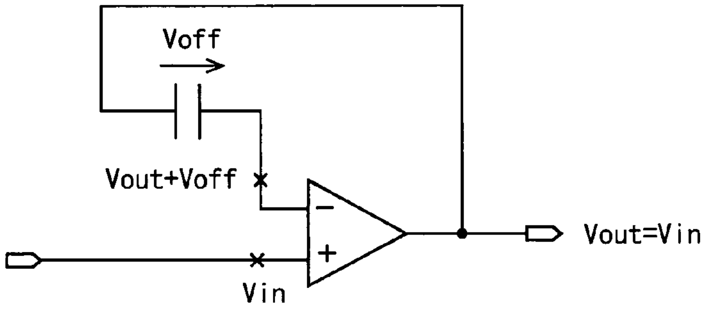
FIG. 5D shows operations of the buffer shown in FIG. 5A.

Each of the control signals SC_A and SC_B exclusively becomes a level at which the switch is changed to a conduction state (corresponding to a high level herein), as shown in FIG. 5B. During a period that the control signal SC_A is at the high level (see FIG. 5C), each of the switches 33 and 34 becomes the conduction state while the switch 35 becomes a non-conduction state. Herein, an offset voltage Voff of the differential amplifier 31 appears between the positive-side input terminal and the negative-side input terminal of the differential amplifier 31. The offset voltage Voff is held by the capacitor 32.

During a period that the control signal SC_B is at the high level (see FIG. 5D), each of the switches 33 and 34 becomes the non-conduction state while the switch 35 becomes the conduction state. As a result, a negative-side input voltage of the differential amplifier 31 varies by the offset voltage Voff, and an output voltage of the differential amplifier 31 (i.e., an output voltage of the buffer) also varies by the same amount and becomes equal to an input voltage Vin. As described above, use of the buffer shown in FIG. 5A allows cancellation of the offset voltage of the differential amplifier 31. Herein, the buffer having the offset cancel function may be incorporated in the peripheral IC provided outside the display panel.

Hereinafter, description will be given of advantageous effects of the display device according to this embodiment. In the display device according to this embodiment, the voltage (VDD+Vx) which depends on the threshold voltage Vth of the driving TFT 11 can be read from the pixel circuit 10 selected by the gate driver circuit 3 and the voltage (Vdata+Vx), which is obtained by adding the correction voltage Vx (the voltage corresponding to the threshold voltage Vth) to the data voltage Vdata, can be applied to the gate terminal of the driving TFT 11. In a driving TFT of a P-channel type, typically, when a voltage, which is obtained by subtraction of an absolute value of a threshold voltage, is applied to a gate terminal, variations in threshold voltage can be compensated. Accordingly, the display device according to this embodiment detects the threshold voltage of the driving TFT 11 to compensate the variations in threshold voltage, and allows the organic EL element 15 to emit light at a desired luminance.

Moreover, the threshold value correction circuit 20 is provided outside the pixel circuit and the threshold voltage is detected by use of the data line Sj, leading to reduction in scale and area of the pixel circuit 10. Further, the threshold voltage is detected as a voltage signal, so that a current-voltage conversion element becomes unnecessary unlike a case where an electric current signal is fed back. Therefore, variations in correction effect can be suppressed. In addition, the correction voltage Vx corresponding to the threshold voltage is added as it is to the data voltage Vdata, so that the threshold value correction can be performed with high accuracy. Moreover, a desired voltage is applied to the gate terminal of the driving TFT 11 through no coupling capacitance. Therefore, an amplitude of the data voltage Vdata can be utilized effectively, leading to reduction in power consumption. Further, no capacitance is provided between the data line Sj and the driving TFT 11, so that the driving TFT 11 can be inspected with ease. Upon inspection of the driving TFT 11, preferably, an electric current flows from the power supply wiring line Vp into the data line Sj via the drain terminal and the gate terminal of the driving TFT 11.

Figure 6A:
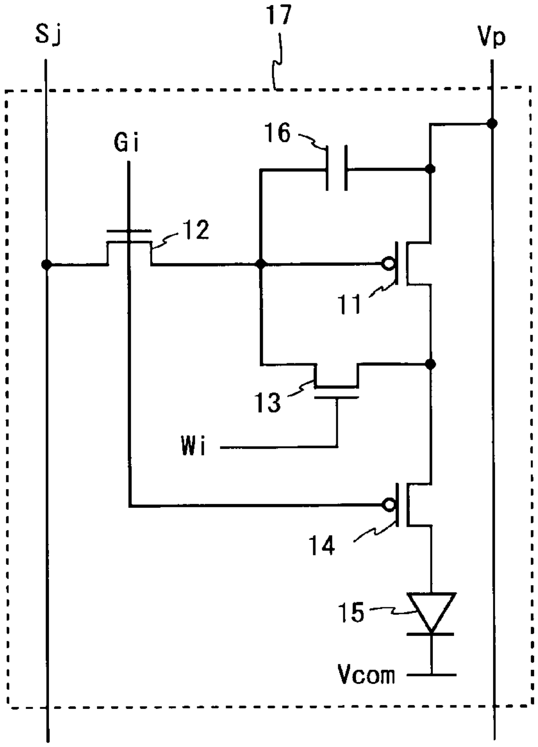
FIG. 6A is a circuit diagram showing a pixel circuit included in a display device according to a first modified example of the first embodiment of the present invention.
Figure 6B:
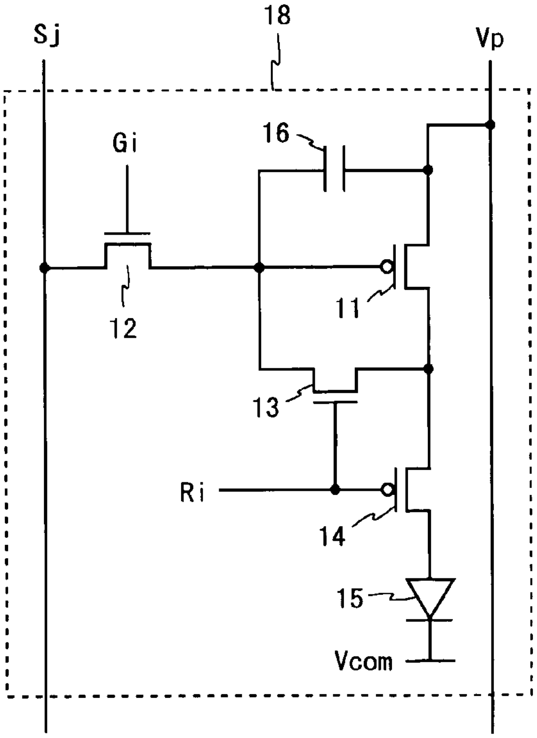
FIG. 6B is a circuit diagram showing a pixel circuit included in a display device according to a second modified example of the first embodiment of the present invention.

The display device according to this embodiment may include a pixel circuit shown in FIG. 6A or 6B in place of the pixel circuit 10. The pixel circuit 17 shown in FIG. 6A is different from the pixel circuit 10 in a point that a switching TFT 14 is connected to a scanning line Gi such that the scanning line Gi and a control line Ri are shared. In the pixel circuit 17, each of switching TFTs 12 and 14 becomes a conduction state exclusively. On the other hand, the pixel circuit 18 shown in FIG. 6B is different from the pixel circuit 10 in a point that a switching TFT 13 is connected to a control line Ri such that the control line Ri and a control line Wi are shared. In the pixel circuit 18, each of switching TFTs 13 and 14 becomes a conduction state exclusively.

Each of the display devices according to these modified examples operates as in the display device including the pixel circuit 10 and has advantageous effects similar to those of the display device including the pixel circuit 10. In addition, the switching TFTs 12 to 14 share a wiring line to be connected to control terminals thereof, so that the number of wiring lines is reduced from three to two. Further, an aperture ratio of a pixel is made higher. Thus, a screen can be made brighter.

Second Embodiment

Figure 7:
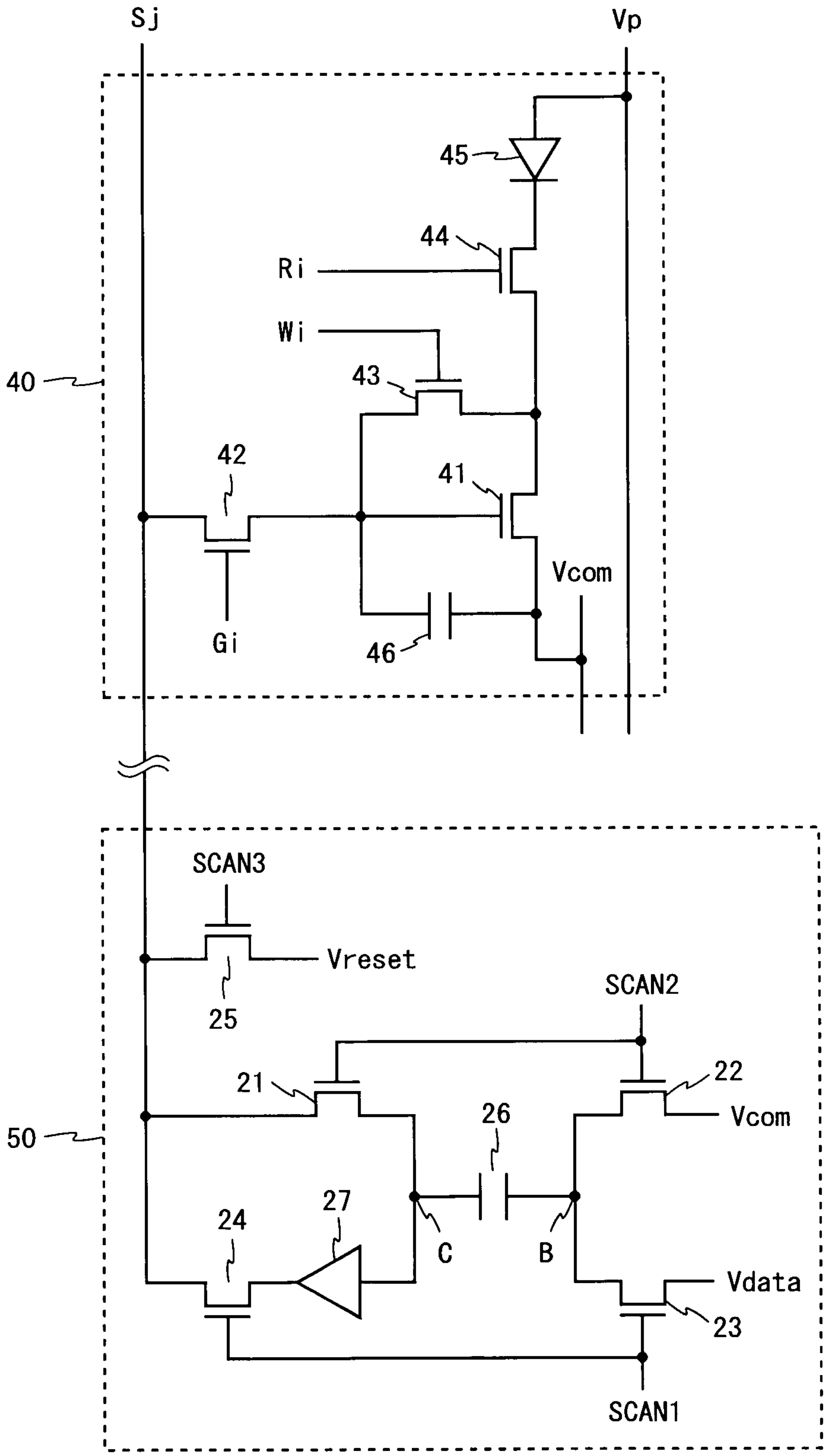
FIG. 7 is a circuit diagram showing a pixel circuit and a threshold value correction circuit each included in the display device according to the second embodiment of the present invention.

FIG. 7 is a circuit diagram showing a pixel circuit and a threshold value correction circuit each included in the display device according to the second embodiment of the present invention. The pixel circuit 40 and the threshold value correction circuit 50 in FIG. 7 correspond to the pixel circuit Aij and the threshold value correction circuit 9 in FIG. 1. As shown in FIG. 7, the pixel circuit 40 includes a driving TFT 41, switching TFTs 42 to 44, an organic EL element 45 and a capacitor 46. The driving TFT 41 is of an enhancement N-channel type, and each of the switching TFTs 42 to 44 is of an N-channel type.

In the pixel circuit 40, the organic EL element 45, the switching TFT 44 and the driving TFT 41 are provided in series between a power supply wiring line Vp and a common cathode Vcom sequentially from a side of the power supply wiring line Vp. The switching TFT 42 is provided between a gate terminal of the driving TFT 41 and a data line Sj. The switching TFT 43 is provided between the gate terminal and a drain terminal of the driving TFT 41, and the capacitor 46 is provided between the gate terminal of the driving TFT 41 and the common cathode Vcom. The switching TFT 42 has a gate terminal connected to a scanning line Gi, the switching TFT 43 has a gate terminal connected to a control line Wi and the switching TFT 44 has a gate terminal connected to a control line Ri.

The threshold value correction circuit 50 has a structure which is equal to that of the threshold value correction circuit 20 according to the first embodiment. In the threshold value correction circuit 50, however, a switch 22 is provided between a node B and the common cathode Vcom. The threshold value correction circuit 50 is equal to the threshold value correction circuit 20 except the point described above.

Figure 8:
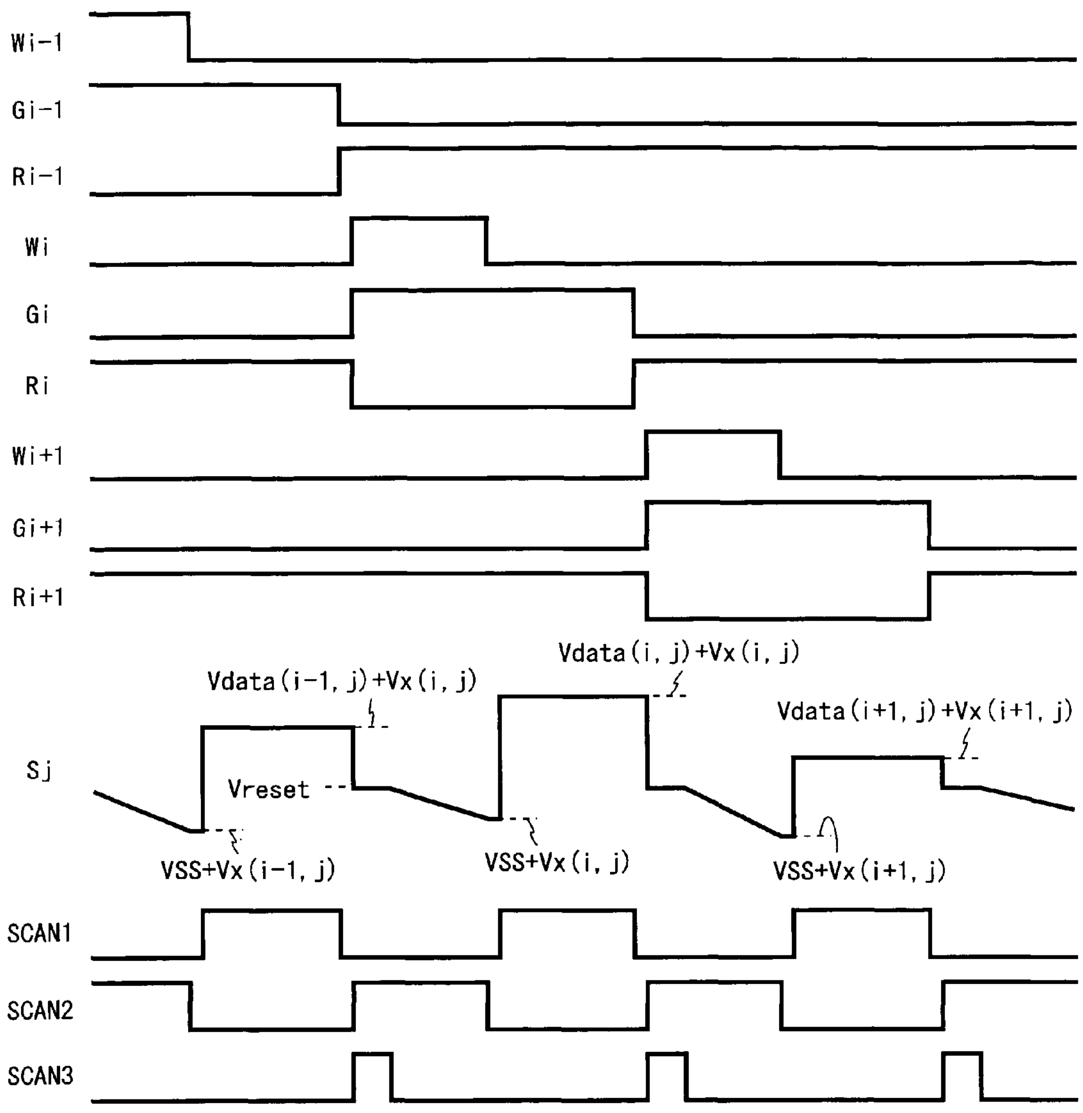
FIG. 8 is a timing chart showing a timing that data is written to the pixel circuit in the display device according to the second embodiment of the present invention.

FIG. 8 is a timing chart showing a timing that data is written to the pixel circuit 40. The display device according to this embodiment operates as in the display device according to the first embodiment, and has advantageous effects similar to those of the display device according to the first embodiment. In a driving TFT of an N-channel type, typically, when a voltage obtained by addition of an absolute value of a threshold voltage is applied to a gate terminal, variations in threshold voltage can be compensated. As in the first embodiment, this embodiment can adopt the modified example that the switching TFTs 42 to 44 share a wiring line to be connected to control terminals thereof.

As described above, the pixel circuit 40, in which each of the driving TFT 41 and the switching TFT 42, 43 and 44 is of an N-channel type, can be applied to a display panel using amorphous silicon.

Third Embodiment

In each of the display devices according to the first and second embodiments, the analog buffer 27 is provided for each data line Sj. In a 2-inch QVGA full-color panel (including RGB sub pixels), however, a pitch between the sub pixels is about 42 μm. The capacitor 26 that holds the correction voltage Vx which depends on the threshold voltage of the driving TFT can be arranged at this pitch, but the high-performance analog buffer 27 can not be arranged at this pitch in some instances. In the third embodiment, therefore, description will be given of the display device in which the number of analog buffers 27 is reduced.

Figure 9:
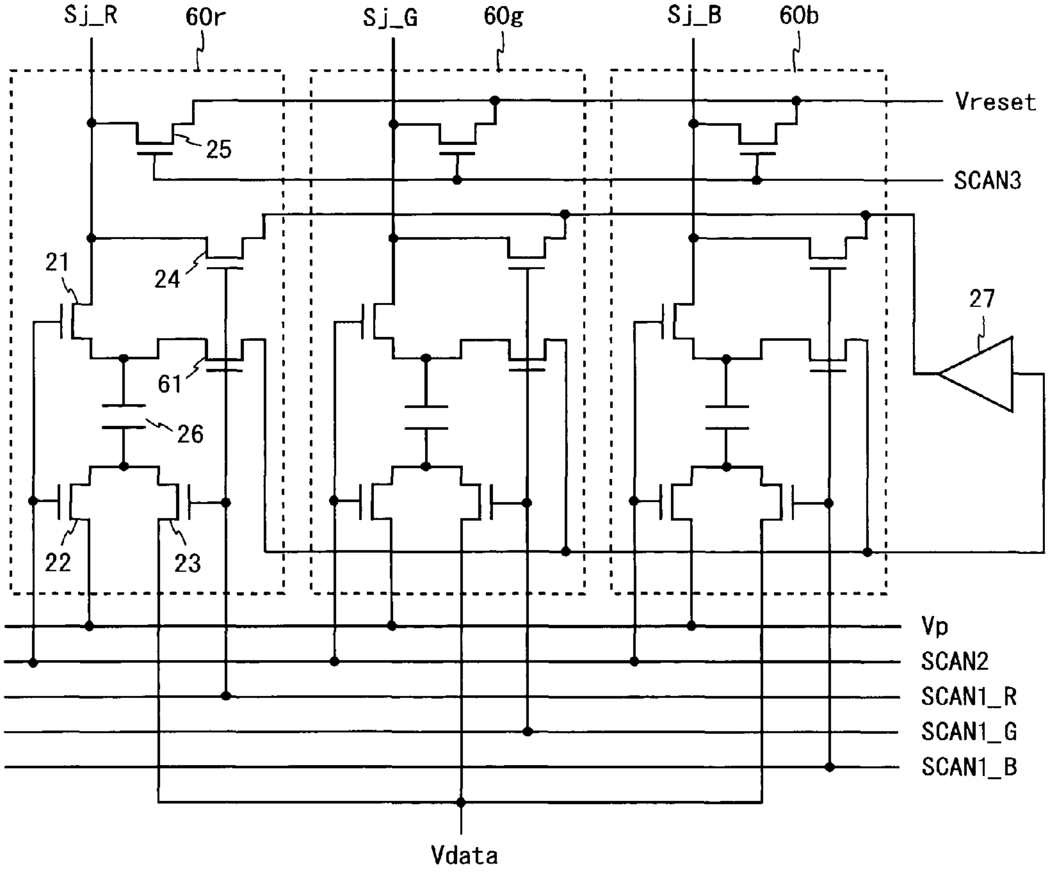
FIG. 9 is a circuit diagram showing a threshold value correction circuit included in the display device according to the third embodiment of the present invention.

FIG. 9 is a circuit diagram showing a threshold value correction circuit included in the display device according to the third embodiment of the present invention. The threshold value correction circuits 60*r*, 60*g* and 60*b* in FIG. 9 correspond to the threshold value correction circuit 9 in FIG. 1. Moreover, data lines Sj_R, Sj_G and Sj_B in FIG. 9 correspond to the data line Sj in FIG. 1.

As shown in FIG. 9, an analog buffer 27 is provided in correspondence with the three data lines Sj_R, Sj_G and Sj_B. The threshold value correction circuit 60*r* is different from the threshold value correction circuit 20 (FIG. 2) according to the first embodiment in a point that a function of sharing the analog buffer 27 is added thereto. In the threshold value correction circuit 60*r*, specifically, a switch 61 is provided between a first electrode of a capacitor 26 (an electrode shown at an upper side of FIG. 9) and an input terminal of the analog buffer 27. Moreover, switches 23, 24 and 61 have gate terminals connected to a control line SCAN1_R. Each of the threshold value correction circuits 60*g* and 60*b* is similar in configuration to the threshold value correction circuit 60*r*.

Figure 10:
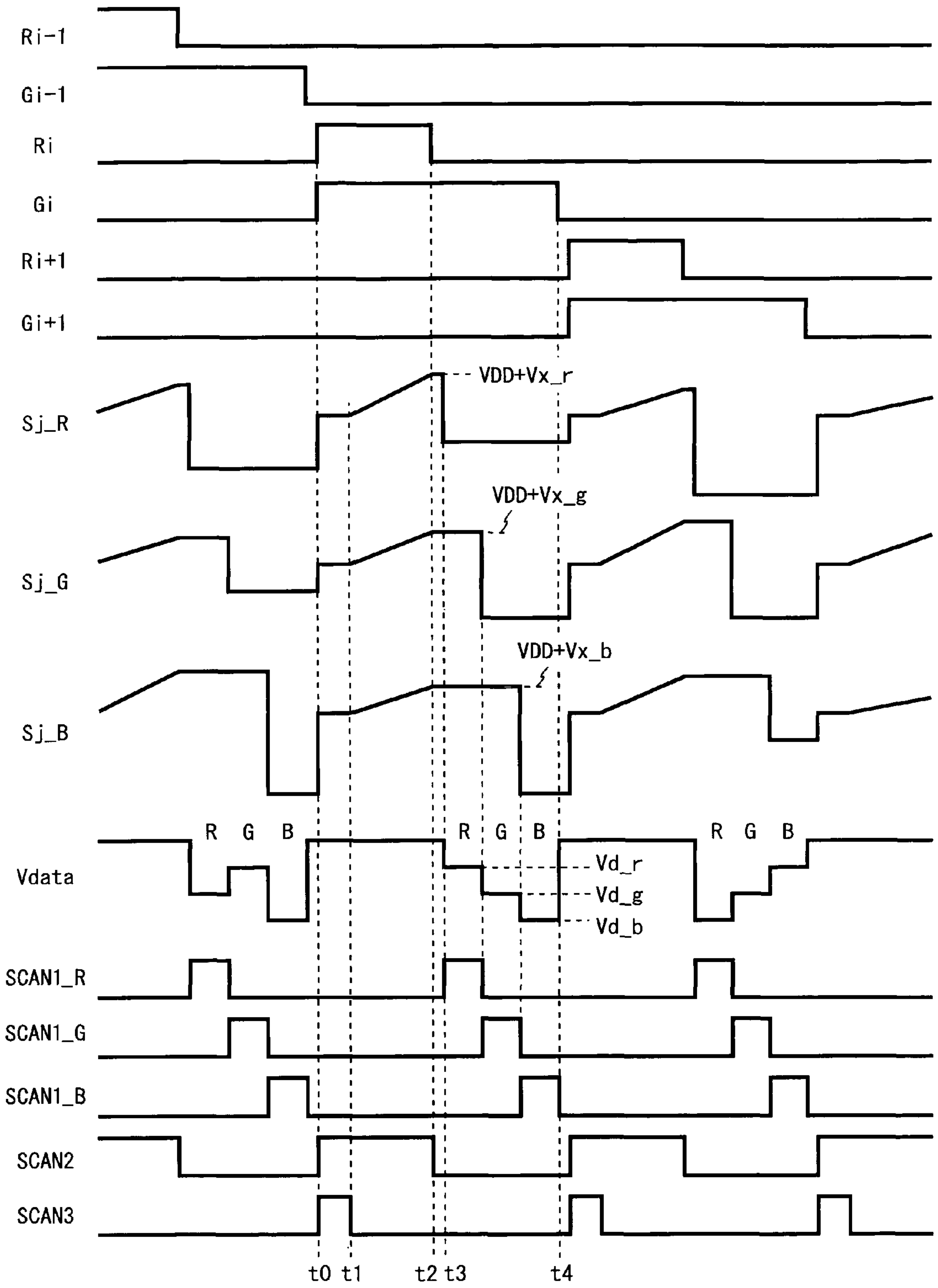
FIG. 10 is a timing chart showing a timing that data is written to a pixel circuit in the display device according to the third embodiment of the present invention.
Figure 11:
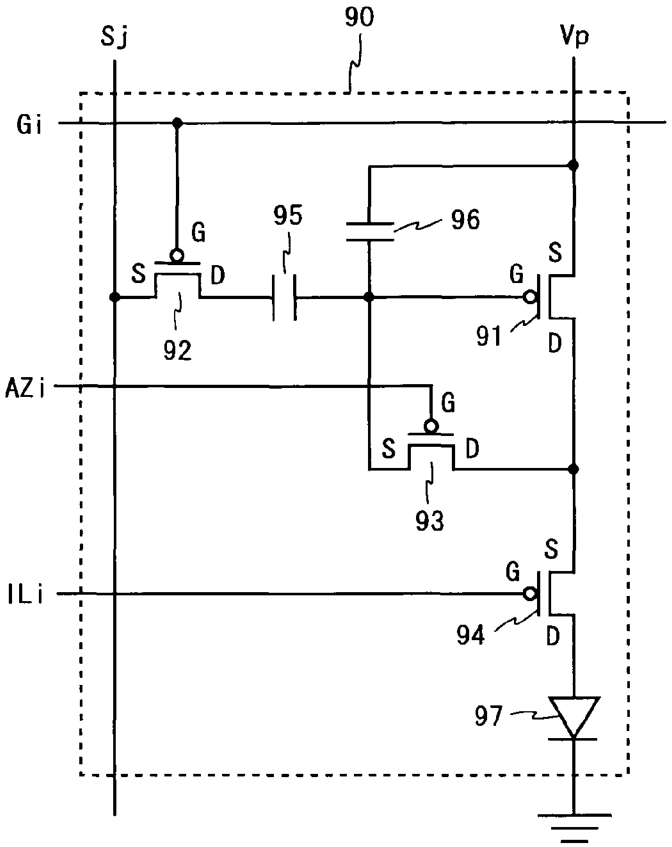
FIG. 11 is a circuit diagram showing a pixel circuit included in a conventional display device.
Figure 12:
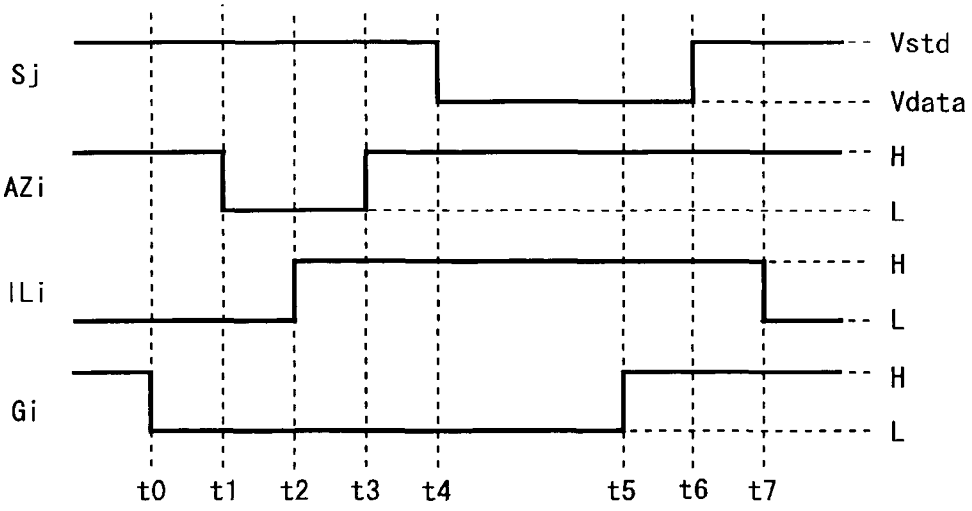
FIG. 12 is a timing chart showing a timing that data is written to the pixel circuit shown in FIG. 11.
Figure 13:
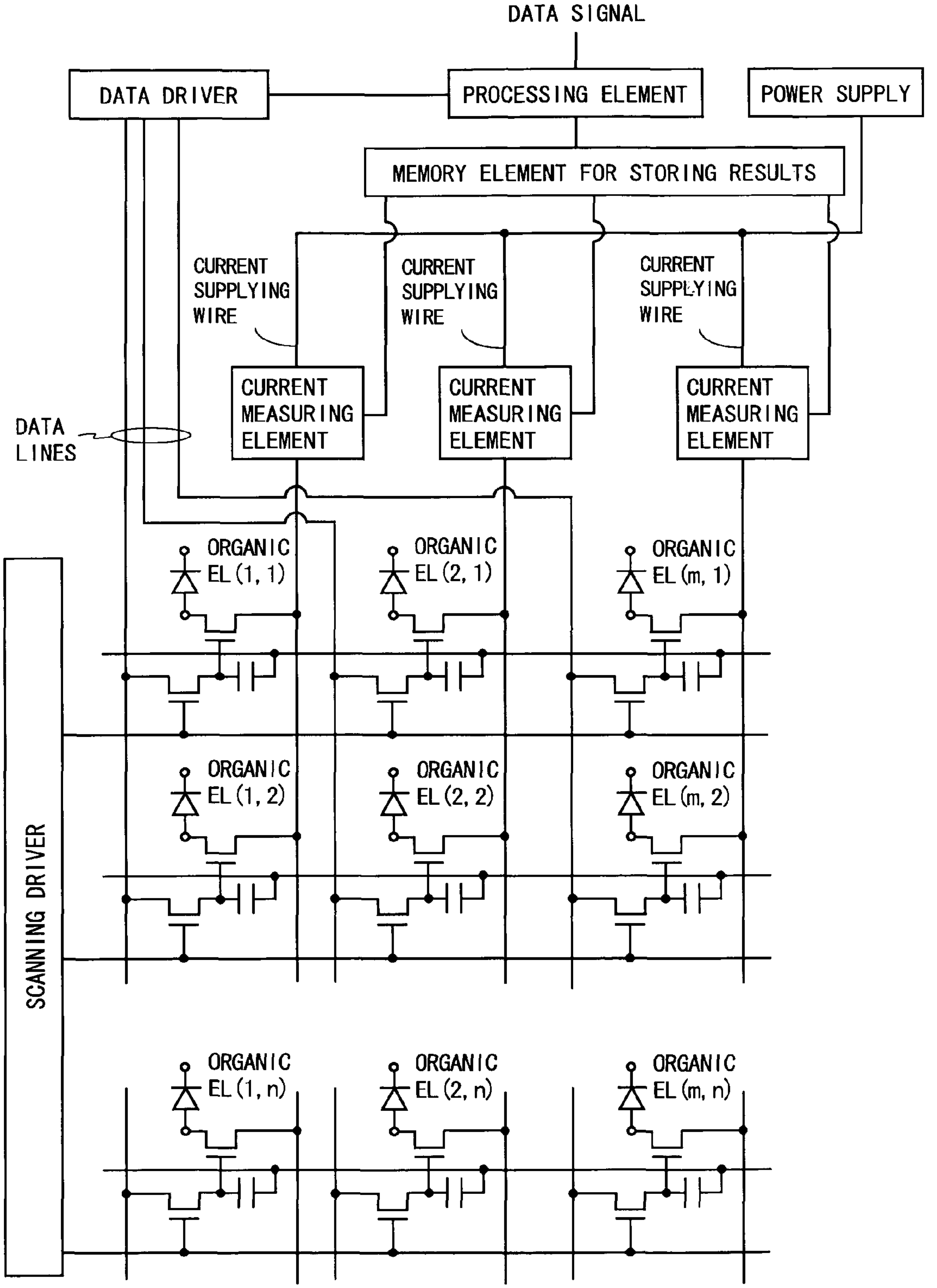
FIG. 13 is a block diagram showing a configuration of the conventional display device.

FIG. 10 is a timing chart showing a timing that data is written to a pixel circuit in the display device according to this embodiment. With reference to FIG. 10, hereinafter, description will be given of operations performed when data is written to each of three pixel circuits connected to a scanning line Gi and the data lines Sj_R, Sj_G and Sj_B. In FIG. 10, a period from a time t0 to a time t4 corresponds to a period for selecting the three pixel circuits. Prior to a time t2, a process of detecting threshold voltages of driving TFTs of the three pixel circuits in parallel is performed. Subsequent to the time t2, a process of writing corrected data voltages to the three pixel circuits in succession is performed. Herein, the display device includes the pixel circuit 18 shown in FIG. 6B; however, a type of the pixel circuit may be arbitrary.

Prior to the time t0, a potential at each of the scanning line Gi and a control line Ri is controlled to a low level. At the time t0, when the potential at each of the scanning line Gi, the control line Ri and a control line SCAN3 is changed to a high level, a potential at each of the data lines Sj_R, Sj_G and Sj_B as well as a potential at each of the gate terminals of the driving TFTs of the three pixel circuits become Vreset.

At a time t1, next, when the potential at the control line SCAN3 is changed to the low level, the potential at each of the data lines Sj_R, Sj_G and Sj_B rises. During a period from the time t0 to the time t2, the potential at each of the control lines SCAN1_R, SCAN1_G and SCAN1_B is controlled to the low level while a potential at a control line SCAN2 is controlled to the high level.

At the time t2, the potentials at the gate terminals of the driving TFTs of the three pixel circuits are assumed to be (VDD+Vx_r), (VDD+Vx_g) and (VDD+Vx_b), respectively (Vx_r, Vx_g, Vx_r: negative values). At the time t2, when the potential at each of the control line Ri and the control line SCAN2 is changed to the low level, the voltages Vx_r, Vx_g and Vx_b are held at the capacitors 26 of the threshold value correction circuit 60*r*, 60*g* and 60*b*, respectively.

During a period from the time t3 to the time t4, next, the potential at each of the control lines SCAN1_R, SCAN1_G and SCAN1_B becomes the high level by a predetermined time and, in synchronization with this, a data voltage Vdata outputted from a D/A converter 8 is changed to Vd_r, Vd_g and Vd_b. With this configuration, first, the potential at the gate terminal of the driving TFT of the pixel circuit connected to the data line Sj_R becomes (Vd_r+Vx_r). Next, the potential at the gate terminal of the driving TFT of the pixel circuit connected to the data line Sj_G becomes (Vd_g+Vx_g). Finally, the potential at the gate terminal of the driving TFT of the pixel circuit connected to the data line Sj_B becomes (Vd_b+Vx_b).

At the time t4, next, when the potential at the scanning line Gi is changed to the low level, the voltages (VDD−Vd_r−Vx_r), (VDD−Vd_g−Vx_g) and (VDD−Vd_b−Vx_b) are held at the capacitors of the three pixel circuits, respectively.

Subsequent to the time t4, the potentials at the gate terminals of the driving TFTs of the three pixel circuits are maintained at (Vd_r+Vx_r), (Vd_g+Vx_g) and (Vd_b+Vx_b), respectively. Herein, amounts of electric currents flowing through the respective driving TFTs increase/decrease in accordance with these potentials. The electric current amount is the same as long as the data voltage is the same even when the threshold voltage is different. Accordingly, an electric current flows into an organic EL element of each pixel circuit in an amount which depends on the data voltage Vdata irrespective of a value of the threshold voltage, so that the organic EL element emits light at a luminance which depends on the data voltage Vdata.

In the foregoing description, the analog buffer is provided in correspondence with the three data lines Sj_R, Sj_G and Sj_B. Alternatively, the analog buffer may be provided in correspondence with "p" (p: an arbitrary integer of two or more) data lines.

As described above, the display device according to this embodiment realizes a display panel with high definition in such a manner that the analog buffer having a large circuit scale is not arranged for each data line, but is arranged for the plurality of data lines.

In the foregoing embodiments, the pixel circuit includes the organic EL element as an electro-optical element. Alternatively, the pixel circuit may include an electro-optical element of an electric current driving type other than the organic EL element (e.g., a semiconductor LED, a light emitting part of an FED). Moreover, the pixel circuit includes, as a drive element of the electro-optical element, the TFT which is a MOS transistor (including a silicon gate MOS structure) formed on an insulating substrate such as a glass substrate. Alternatively, the pixel circuit may include an arbitrary voltage controlling element having a threshold voltage (i.e. an element that changes an output current in accordance with a control voltage applied to a control terminal thereof and interrupts the output current when the control voltage becomes not less than or not more than a predetermined value). Accordingly, the pixel circuit may include, as a drive element, a typical insulating gate-type field effect transistor including a MOS transistor formed on a semiconductor substrate.

In the first embodiment, the switching TFT 12 is changed to the conduction state and, almost simultaneously, the switching TFT 13 is changed to the conduction state while the switching TFT 14 is changed to the non-conduction state. Alternatively, before the switching TFT 12 is changed to the conduction state, the switching TFT 13 may be changed to the conduction state while the switching TFT 14 may be changed to the non-conduction state. The same thing holds true for the second and third embodiments.

The present invention is not limited to the foregoing embodiments and may be modified variously. Moreover, an embodiment obtained by appropriately combining the technical means disclosed in the different embodiments with one another is also involved in the technical scope of the present invention.

INDUSTRIAL APPLICABILITY

The display device according to the present invention has an advantageous effect of efficiently utilizing an amplitude of a data voltage and performing threshold value correction with high accuracy, without increasing a scale of a pixel circuit. Therefore, the display device according to the present invention can be used as a display device for various electronic appliances.

The invention claimed is:

1. A display device of an electric current driving type, comprising:
  - a plurality of pixel circuits arranged in correspondence with intersections of a plurality of scanning lines and a plurality of data lines;
  - a scanning signal output circuit configured to,
    - select a write-target pixel circuit through use of the scanning line, and
    - set a threshold value correction period within a selection period of the write-target pixel circuit; and
  - a display signal output circuit including a plurality of correcting capacitances, the display signal output circuit configured to drive the data lines using the plurality of correcting capacitances, each of the plurality of correcting capacitances being provided for each data line, wherein each pixel circuit includes,
    - an electro-optical element provided between two power supply wiring lines;
    - a drive element provided together with the electro-optical element in series between the power supply wiring lines, the drive element having a control terminal, a first conductive terminal and a second conductive terminal;
    - a first switching element connected to the control terminal of the drive element and the data line without a capacitor therebetween; and
    - a second switching element provided between the control terminal and the first conductive terminal of the drive element,
  - the display signal output circuit is configured to apply a constant initial voltage to the data line before the start of the threshold value correction period to apply the initial voltage to the control terminal of the drive element in the write-target pixel circuit,
  - the scanning signal output circuit is configured to,
    - in the threshold value correction period for the write-target pixel circuit, set the second switching element at a conduction state to make a voltage between the control terminal and the second conductive terminal of the drive element approximate a threshold voltage of the drive element, and in the threshold value correction period for the write-target pixel circuit, control so that a voltage of the control terminal of the drive element is output to the data line, the display signal output circuit is further configured to, hold a voltage of the data line in the correcting capacitance at the end of the threshold value correction period, and apply, to the data line in the threshold value correction period, a corrected data voltage obtained by adding or subtracting the voltage held in the correcting capacitance to or from a data voltage corresponding to display data to apply the corrected data voltage to the control terminal of the drive element in the write-target pixel circuit, and the scanning signal output circuit is configured to set the threshold value correction period such that the threshold value correction period ends before the voltage between the control terminal and the second conductive terminal of the drive element reaches the threshold voltage of the drive element.

2. The display device according to claim 1, wherein the pixel circuit further includes, a third switching element provided together with the electro-optical element and the drive element in series between the power supply wiring lines; and a capacitance having one end connected to the control terminal of the drive element.

3. The display device according to claim 2, wherein the scanning signal output circuit is further configured to control the write-target pixel circuit such that the first and second switching elements are set at a conduction state, the third switching element is set at a non-conduction state in the threshold value correction period, the second switching element is changed to the non-conduction state at the end of the threshold value correction period, and the first switching element is changed to the non-conduction state and the third switching element is changed to the conduction state at the end of the selection period.

4. The display device according to claim 2, wherein each of the drive element and the first to third switching elements is a thin film transistor, one of the first and third switching elements is of a P-channel type and the other switching element is of an N-channel type, and the first and third switching elements have control terminals connected to a common wiring line.

5. The display device according to claim 2, wherein each of the drive element and the first to third switching elements is a thin film transistor, one of the second and third switching elements is of a P-channel type and the other switching element is of an N-channel type, and the second and third switching elements have control terminals connected to a common wiring line.

6. The display device according to claim 1, wherein the display signal output circuit further includes a plurality of analog buffers, and a plurality of switch circuits provided for each data line, and each of the plurality of switch circuits switches between a state that one electrode of the correcting capacitance is connected to the data line and the other electrode thereof is applied with a constant voltage and a state that one electrode of the correcting capacitance is connected to the data line through the analog buffer and the other electrode thereof is applied with the data voltage.

7. The display device according to claim 6, wherein at least one of the plurality of analog buffers is provided for the plurality of data lines.

8. A method for driving a display device including a plurality of pixel circuits arranged in correspondence with intersections of a plurality of scanning lines and a plurality of data lines, each pixel circuit including, an electro-optical element between two power supply wiring lines, a drive element provided together with the electro-optical element in series between the power supply wiring lines, the drive element having a control terminal, a first conductive terminal and a second conductive terminal, a first switching element connected to the control terminal of the drive element and the data line without a capacitor therebetween, and a second switching element provided between the control terminal and the first conductive terminal of the drive element, the method comprising the steps of:

selecting a write-target pixel circuit through use of the scanning line, and setting a threshold value correction period within a selection period of the write-target pixel circuit;

applying a constant initial voltage to the data line before the start of the threshold value correction period to apply the initial voltage to the control terminal of the drive element in the write-target pixel circuit;

in the threshold value correction period for the write-target pixel circuit, setting the second switching element at a conduction state to make a voltage between the control terminal and the second conductive terminal of the drive element approximate a threshold voltage of the drive element, and controlling so that a voltage of the control terminal of the drive element is output to the data line; and holding a voltage of the data line in a correcting capacitance provided for each data line at the end of the threshold value correction period, and applying, to the data line in the threshold value correction period, a corrected data voltage obtained by adding or subtracting the voltage held in the correcting capacitance to or from a data voltage corresponding to display data to apply the corrected data voltage to the control terminal of the drive element in the write-target pixel circuit, wherein the setting the threshold value correction period sets the threshold value correction period such that the threshold value correction period ends before the voltage between the control terminal and the second conductive terminal of the drive element reaches the threshold voltage of the drive element.

9. The display device according to claim 1, wherein the scanning signal output circuit and the display signal output circuit are peripheral circuits of the plurality of pixel circuits, and the selected pixel circuit outputs the voltage which depends on the threshold voltage of the drive element peripherally from the selected pixel circuit.

10. The display device according to claim 1, wherein the selected pixel circuit outputs the voltage which depends on the threshold voltage of the drive element to a peripheral circuit.

* * * * *